US010583564B2

United States Patent
Yokoya et al.

(10) Patent No.: US 10,583,564 B2
(45) Date of Patent: Mar. 10, 2020

(54) ROBOT AND METHOD USED IN ROBOT

(71) Applicant: Panasonic Intellectual Property Management Co., Ltd., Osaka (JP)

(72) Inventors: Mayu Yokoya, Tokyo (JP); Kazunori Yamada, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 197 days.

(21) Appl. No.: 15/620,803

(22) Filed: Jun. 12, 2017

(65) Prior Publication Data
US 2018/0001485 A1  Jan. 4, 2018

(30) Foreign Application Priority Data

Jun. 29, 2016 (JP) .................................. 2016-129245
Mar. 1, 2017 (JP) .................................. 2017-038569

(51) Int. Cl.
| | |
|---|---|
| *G01C 21/00* | (2006.01) |
| *B25J 13/08* | (2006.01) |
| *A61H 3/04* | (2006.01) |
| *B25J 5/00* | (2006.01) |

(52) U.S. Cl.
CPC .............. *B25J 13/085* (2013.01); *A61H 3/04* (2013.01); *B25J 5/007* (2013.01); *A61H 2003/043* (2013.01); *A61H 2201/5007* (2013.01); *A61H 2201/5061* (2013.01); *Y10S 901/01* (2013.01)

(58) Field of Classification Search
CPC ........... B25J 13/085; B25J 5/007; A61H 3/04; A61H 2201/5061; A61H 2201/5007; A61H 2003/043; Y10S 901/01
See application file for complete search history.

(56) References Cited

U.S. PATENT DOCUMENTS

| | | | | |
|---|---|---|---|---|
| 8,442,753 B2 * | 5/2013 | Doi ...................... | B62K 11/007 | 701/124 |
| 8,825,254 B2 * | 9/2014 | Kobashi ................... | B62H 1/12 | 701/22 |
| 2008/0039990 A1 * | 2/2008 | Stevens ................ | G05D 1/0891 | 701/22 |

(Continued)

FOREIGN PATENT DOCUMENTS

JP        2010-271911        12/2010

OTHER PUBLICATIONS

NPL:JPO English Translation for JP201027191; Year/Date: Dec. 2, 2010.*

*Primary Examiner* — Ian Jen
(74) *Attorney, Agent, or Firm* — Greenblum & Bernstein, P.L.C.

(57) ABSTRACT

A robot includes a body, a handle provided on the body and holdable by a user, a detector that detects a load applied to the handle, a movement device that includes a rotation member and moves the robot by controlling rotation of the rotation member in accordance with the detected load, and a generator that generates tendency data, which indicates tendency of the load applied to the handle, on the basis of past load data regarding the handle obtained while the robot is moving. The movement device includes an actuator that controls a rotation speed of the rotation member on the basis of the detected load and the generated tendency data.

19 Claims, 29 Drawing Sheets

(56) References Cited

U.S. PATENT DOCUMENTS

| | | | | |
|---|---|---|---|---|
| 2010/0114468 A1* | 5/2010 | Field | ............... | B60N 2/045 701/124 |
| 2011/0010013 A1* | 1/2011 | Ruan | ............... | B25J 5/007 700/261 |
| 2011/0209929 A1* | 9/2011 | Heinzmann | ............... | B60L 58/12 180/6.2 |
| 2011/0313568 A1* | 12/2011 | Blackwell | ............... | B25J 5/007 700/245 |

* cited by examiner

FIG. 6

| TYPE OF MOVEMENT | USER'S LOAD TENDENCY DATA ||
|---|---|---|
| | FLUCTUATION FREQUENCY IN MOVEMENT DIRECTION DURING WALKING | FLUCTUATION FREQUENCY IN CENTER OF GRAVITY OFFSET DIRECTION DURING WALKING |
| FORWARD MOVEMENT | Fz:2Hz | My:2Hz |
| REARWARD MOVEMENT | Fz:1Hz | My:0.5Hz |
| RIGHT-TURN MOVEMENT | Fz:6Hz | My:4Hz |
| ... | ... | ... |

FIG. 8

| INPUT WAVEFORM | DATE | HANDLE LOAD | | | | | |
|---|---|---|---|---|---|---|---|
| | | Fx | Fy | Fz | Mx | My | Mz |
| 1 | 2015/02/03 17:15:20.010 | -0.170888 | 0.604472 | -0.932255 | -0.001003 | -0.003041 | -0.002908 |
| | 2015/02/03 17:15:20.020 | -0.018309 | 0.450270 | -0.321941 | -0.002569 | -0.001520 | -0.004744 |
| | ... | ... | ... | ... | ... | ... | ... |
| | 2015/02/03 17:15:25.030 | -0.180888 | 0.504472 | -0.732255 | -0.003003 | -0.005041 | -0.003908 |
| 2 | 2015/02/03 17:15:35.030 | -0.130888 | 0.704472 | -0.532255 | -0.005003 | -0.003341 | -0.002970 |
| | ... | ... | ... | ... | ... | ... | ... |
| | 2015/02/03 17:15:45.030 | -0.123888 | 0.794472 | -0.502255 | -0.015003 | -0.023341 | -0.032970 |
| ... | ... | ... | ... | ... | ... | ... | ... |

FIG. 16

| TYPE OF MOVEMENT | USER'S LOAD TENDENCY DATA ||
|---|---|---|
| | AVERAGE LOAD IN MOVEMENT DIRECTION DURING WALKING | AVERAGE LOAD IN CENTER OF GRAVITY OFFSET DIRECTION DURING WALKING |
| FORWARD MOVEMENT | Fy:10N | Mz:1.0Nm |
| REARWARD MOVEMENT | Fy:-10N | Mz:-1.0Nm |
| RIGHT-TURN MOVEMENT | Fy:4N | Mz:5Nm |
| ... | ... | ... |

FIG. 26A

| USER NAME | WALKING SPEED | PACE | BODY INCLINATION | STAGGER | | STRIDE | LEG MUSCULAR STRENGTH | | |
|---|---|---|---|---|---|---|---|---|---|
| | | | | | | | TIBIALIS ANTERIOR | PERONEUS | ... |
| A | 56 cm/s | 106 STEPS/min | Fy:-10N Mz:1.0Nm | Fz:2Hz My:2Hz | LEFT LEG | 50 cm | 5 | 4 | ... |
| | | | | | RIGHT LEG | 20 cm | 2 | 5 | ... |

FIG. 26B

| USER NAME | MOVEMENT DIRECTION | INPUT WAVEFORM | WALKING SPEED | PACE | AVERAGE LOAD IN MOVEMENT DIRECTION | AVERAGE LOAD IN CENTER OF GRAVITY OFFSET DIRECTION | FLUCTUATION FREQUENCY IN MOVEMENT DIRECTION | FLUCTUATION FREQUENCY IN LATERAL DIRECTION | | STRIDE | LEG MUSCULAR STRENGTH | |
|---|---|---|---|---|---|---|---|---|---|---|---|---|
| | | | | | | | | | | | TIBIALIS ANTERIOR | PERONEUS |
| A | FORWARD MOVEMENT | No. 1 No. 3 | 56 cm/s | 106 STEPS/min | Fy:-10N | Mz:1.0Nm | Fz:2Hz | My:2Hz | LEFT LEG | 50 cm | 5 | 4 |
| | | | | | | | | | RIGHT LEG | 20 cm | 2 | 5 |
| | ... | | ... | ... | ... | ... | ... | ... | ... | ... | ... | ... |

ROBOT AND METHOD USED IN ROBOT

BACKGROUND

1. Technical Field

The present disclosure relates to a walking assist robot and a method for assisting walking that assist a user in walking.

2. Description of the Related Art

During these years, guide mobile robots that calculate a movement speed on the basis of an input from a user, take the user's hand, and guide the user to a destination are being developed (e.g., refer to Japanese Unexamined Patent Application Publication No. 2010-271911).

In Japanese Unexamined Patent Application Publication No. 2010-271911, a guide robot is disclosed that calculates a target speed of a body in accordance with an input to a handle from a user and causes the body to move at the calculated target speed.

SUMMARY

There is still room for improvement in the robot disclosed in Japanese Unexamined Patent Application Publication No. 2010-271911 in terms of comfortable assistance for a user in walking.

One non-limiting and exemplary embodiment provides a walking assist robot and a method for assisting walking capable of assisting a user in walking more comfortably.

In one general aspect, the techniques disclosed here feature a robot includes a body, a handle provided on the body and holdable by a user, a detector that detects a load applied to the handle, a movement device that includes a rotation member and moves the robot by controlling rotation of the rotation member in accordance with the detected load, and a generator that generates tendency data, which indicates tendency of the load applied to the handle, on the basis of past load data regarding the handle obtained while the robot is moving. The movement device includes an actuator that controls a rotation speed of the rotation member on the basis of the detected load and the generated tendency data.

As described above, with the walking assist robot and the method for assisting walking in the present disclosure, it is possible to assist a user in walking more comfortably.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating a load tendency map according to the first embodiment of the present disclosure;

FIG. 8 illustrates an example of input waveform information regarding handle loads;

FIG. 16 is a diagram illustrating a load tendency map according to a second embodiment of the present disclosure;

FIG. 26A illustrates an example of physical information stored in a physical information database of the walking assist robot according to the third embodiment of the present disclosure;

FIG. 26B illustrates another example of the physical information stored in the physical information database of the walking assist robot according to the third embodiment of the present disclosure;

DETAILED DESCRIPTION

Figure 1:
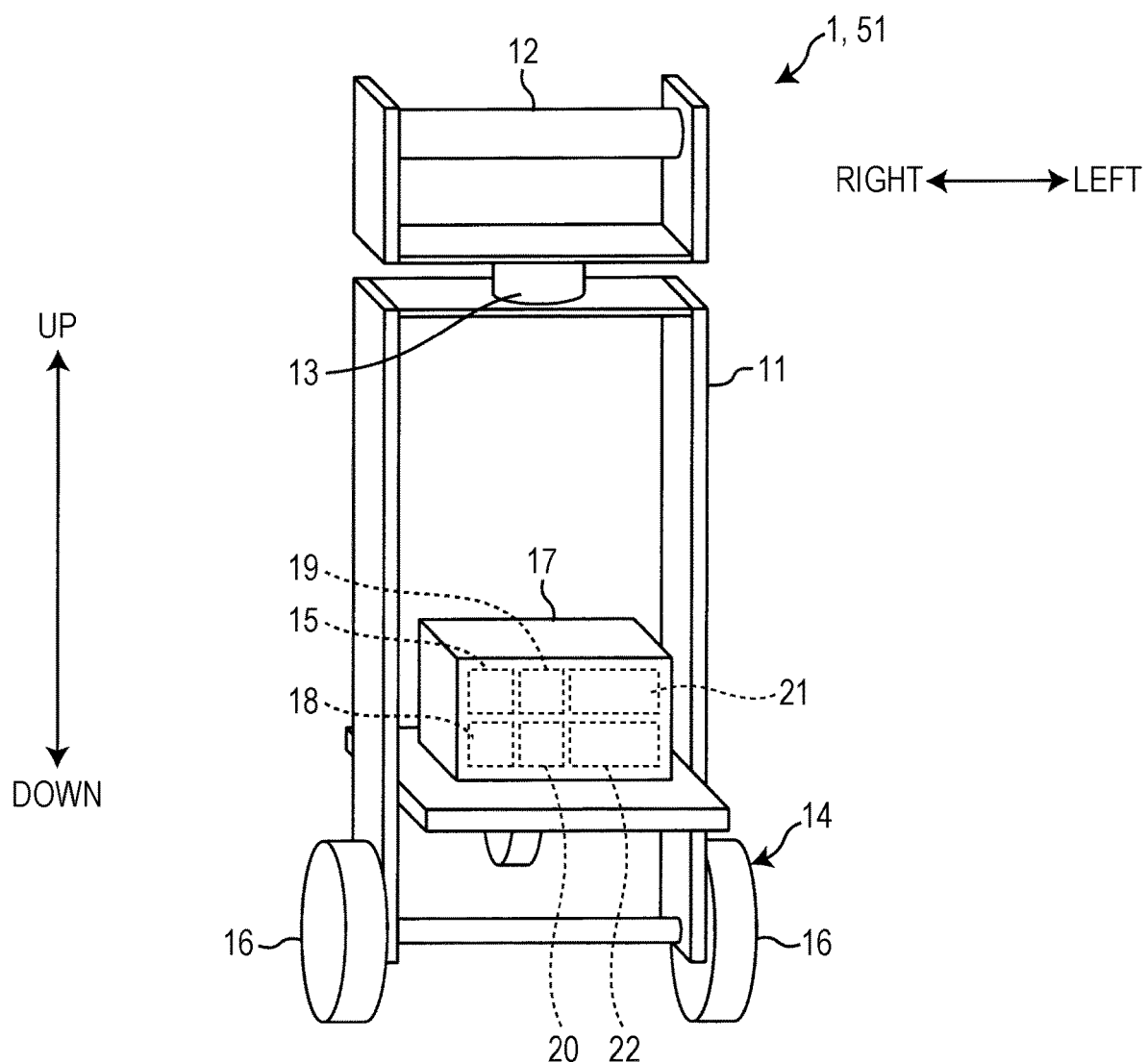
FIG. 1 is a diagram illustrating the appearance of a walking assist robot according to a first embodiment of the present disclosure.

Underlying Knowledge Forming Basis of Present Disclosure

As the population ages in developed countries, there is an increasing necessity to take care of elderly people and support their lives. Since levels of physical ability of elderly people are relatively low, it tends to be difficult for them to maintain the quality of life (QOL) while staying home. In order to prevent sarcopenia and maintain physical ability, it is important to maintain the amount of muscle by making it a habit to do a certain degree of exercise. If an elderly person tends to stay home due to a decline in physical ability, it is difficult for him/her to make it a habit to do a certain degree of exercise, and the amount of muscle further decreases. In this context, various apparatuses for assisting a user in walking have been proposed in recent years.

As described above, a guide mobile robot that moves at a movement speed according to an input from a user is disclosed in Japanese Unexamined Patent Application Publication No. 2010-271911. With the guide mobile robot, however, it is difficult to assist a user whose level of physical ability is low, such as an elderly person, in walking comfortably.

An elderly person whose level of physical ability is low, for example, might lean on the guide mobile robot in a forward direction. In this case, the guide mobile robot moves forward faster since an input value in the forward direction becomes larger, although the elderly person is walking slowly. As a result, the elderly person might not be able to follow the guide mobile robot. In addition, an elderly person might be staggering while moving forward. In this case, the guide mobile robot might detect inputs in a lateral direction and move left and right. The guide mobile robot might thus move in a direction that is not intended by a user whose level of physical ability is low even when the user desires to move forward. With the guide mobile robot, therefore, the user needs to walk while constantly adjusting his/her movement direction, and it is difficult to assist the user in walking comfortably.

The present inventors have found that, even if a user is staggering, the user's intended type of movement can be detected by accumulating information regarding movement operations of a walking assist robot (e.g., movement directions and movement speeds). The present inventors have then arrived at the following aspects of the present disclosure in order to cause a robot to move in accordance with the user's intended type of movement on the basis of the accumulated information regarding the movement operations even if the user is staggering.

A robot according to an aspect of the present disclosure includes:

a body;

a handle provided on the body and holdable by a user;

a detector that detects a load applied to the handle;

a movement device that includes a rotation member and moves the robot by controlling rotation of the rotation member in accordance with the detected load; and a generator that generates tendency data, which indicates tendency of the load applied to the handle, on the basis of past load data regarding the handle obtained while the robot is moving, in which the movement device includes an actuator that controls a rotation speed of the rotation member on the basis of the detected load and the generated tendency data.

With this configuration, it is possible to assist the user in walking in accordance with the user's level of physical ability and assist the user in walking more comfortably.

The movement device may further include a corrector that corrects the detected load on the basis of the tendency data, and the actuator may control the rotation speed of the rotation member on the basis of the corrected load.

With this configuration, the load can be corrected on the basis of the tendency data, and it becomes possible to assist the user in walking more comfortably.

The generator may generate the tendency data for each type of movement of the robot, and the corrector may correct the load on the basis of the tendency data corresponding to a movement operation of the robot at a time when the load is detected.

With this configuration, the tendency data can be generated for each movement operation, and the user's load tendency can be detected more accurately. As a result, it becomes possible to assist the user in walking more comfortably.

If the tendency data corresponding to the movement operation of the robot becomes equal to or higher than a certain threshold, the corrector may correct the load on the basis of the tendency data.

With this configuration, if the tendency data corresponding to the movement operation of the robot becomes equal to or higher than the certain threshold, the load can be corrected, and it becomes possible to assist the user in walking more comfortably.

The tendency data may be a fluctuation frequency calculated from the past load data, and the corrector may correct the load by filtering a fluctuation frequency component of the detected load.

With this configuration, by using the fluctuation frequency as the tendency data, various types of tendency data regarding the user, that is, small and large fluctuations, can be obtained in order to correct the load. As a result, it becomes possible to assist the user in walking more comfortably.

The tendency data may be an average load calculated from the past load data, and the corrector may correct the load on the basis of the average load.

With this configuration, by using the average load as the tendency data, a load constantly applied by each user can be obtained as the tendency data in order to correct the load, and it becomes possible to assist the user in walking more comfortably.

The corrector may correct the load by subtracting the average load from the detected load.

With this configuration, by subtracting the average load from the load detected by the detector, the load constantly applied by each user can be reduced, and it becomes possible to assist the user in walking more comfortably.

The robot may further include:

a physical information estimator that estimates physical information regarding the user, in which the corrector may correct the load on the basis of the estimated physical information.

With this configuration, a degree of correction can be adjusted on the basis of the physical information, and it becomes possible to assist the user in walking in accordance with the user's level of physical ability.

The robot may further include:

a user notifier that notifies the user of the physical information.

With this configuration, the user can understand his/her daily physical information. As a result, the user is motivated to maintain or improve his/her level of physical ability and becomes alert during walking.

The robot may further include:

an intention estimator that estimates the user's intended type of movement on the basis of the corrected load, in which the user notifier may notify the user of the user's intended type of movement.

With this configuration, the user can understand a control state of the robot.

The robot may further include:

a storage that stores a control table indicating a correspondence between the load applied to the handle and the rotation speed of the rotation member, in which the actuator may drive the rotation member with a rotation speed corresponding to the detected load using the control table, and in which the control table may be updated by correcting the load on the basis of the tendency data.

With this configuration, the correspondence between the load applied to the handle and the rotation speed of the rotation member can be identified using the control table, and it becomes easier to assist the user in walking in accordance with the user's level of physical ability.

The detector may detect loads applied to the handle along a plurality of axes, and the movement device may switch a movement operation of the robot by controlling the rotation of the rotation member in accordance with the loads applied along the plurality of axes.

With this configuration, the user's intended type of movement can be detected more accurately by detecting the loads applied along the plurality of axes. As a result, the movement operation of the robot can be switched in accordance with the user's intended type of movement.

Movement operations may include forward movement, rearward movement, and turn movement of the robot.

With this configuration, the movement operation of the robot can be switched in accordance with the user's intended type of movement, and it becomes possible to assist the user in walking more comfortably.

The actuator may change a turning radius of the turn movement on the basis of the tendency data.

With this configuration, the robot turns in accordance with the user's level of physical ability, and it becomes possible to assist the user in walking more comfortably.

A method according to an aspect of the present disclosure is a method used in a robot. The method includes:

detecting a load applied to a handle of the robot using a detector;

generating tendency data, which indicates tendency of the load applied to the handle, on the basis of past load data regarding the handle obtained while the robot is moving; and controlling a rotation speed of a rotation member included in a movement device of the robot on the basis of the detected load and the generated tendency data.

With this configuration, it is possible to assist the user in walking in accordance with the user's level of physical ability and assist the user in walking more comfortably.

The method may further include:

correcting the detected load on the basis of the tendency data, wherein the controlling may control the rotation speed of the rotation member on the basis of the corrected load.

With this configuration, the load can be corrected on the basis of the tendency data, and it becomes possible to assist the user in walking more comfortably.

The method may further include:

estimating physical information regarding a user, wherein the correcting may correct the load on the basis of the physical information.

With this configuration, a degree of correction can be adjusted on the basis of the physical information, and it becomes possible to assist the user in walking in accordance with the user's level of physical ability.

The method may further include:

notifying the user of the physical information.

With this configuration, the user can understand his/her daily physical information. As a result, the user is motivated to maintain or improve his/her level of physical ability and becomes alert during walking.

The method may further include:

estimating the user's intended type of movement on the basis of the corrected load, in which the notifying may notify the user of the user's intended type of movement.

With this configuration, the user can understand a state of walking assistance.

Embodiments of the present disclosure will be described hereinafter with reference to the accompanying drawings. In the drawings, components are exaggerated in order to clarify points in description.

First Embodiment

Overall Configuration

Figure 2:
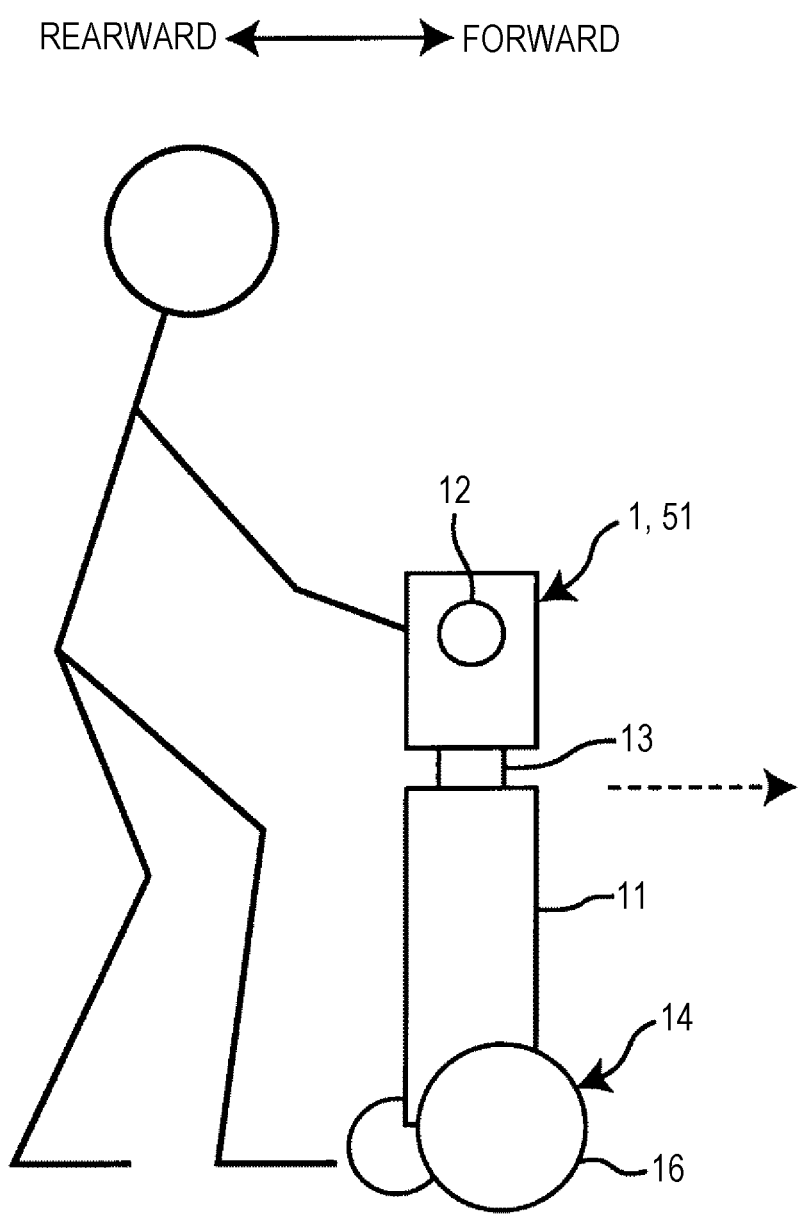
FIG. 2 is a diagram illustrating a user walking with the assistance of the walking assist robot according to the first embodiment of the present disclosure.

FIG. 1 is a diagram illustrating the appearance of a walking assist robot 1 (hereinafter referred to as a "robot 1") according to a first embodiment. FIG. 2 illustrates a user walking with the assistance of the robot 1.

As illustrated in FIGS. 1 and 2, the robot 1 includes a body 11, a handle 12 that the user can hold, a detector 13 that detects a handle load applied to the handle 12, a movement device 14 that moves the body 11, and a load tendency data generation unit 15.

The handle 12 is arranged over the body 11 at a certain position in a certain shape so that the user can easily hold the handle 12 with both hands while walking.

The detector 13 detects a load (handle load) that the user applies to the handle 12 by holding the handle 12. More specifically, when the user holds the handle 12 and walks, the user applies the handle load to the handle 12. The detector 13 detects a direction and the magnitude of the handle load that the user applies to the handle 12.

Figure 3:
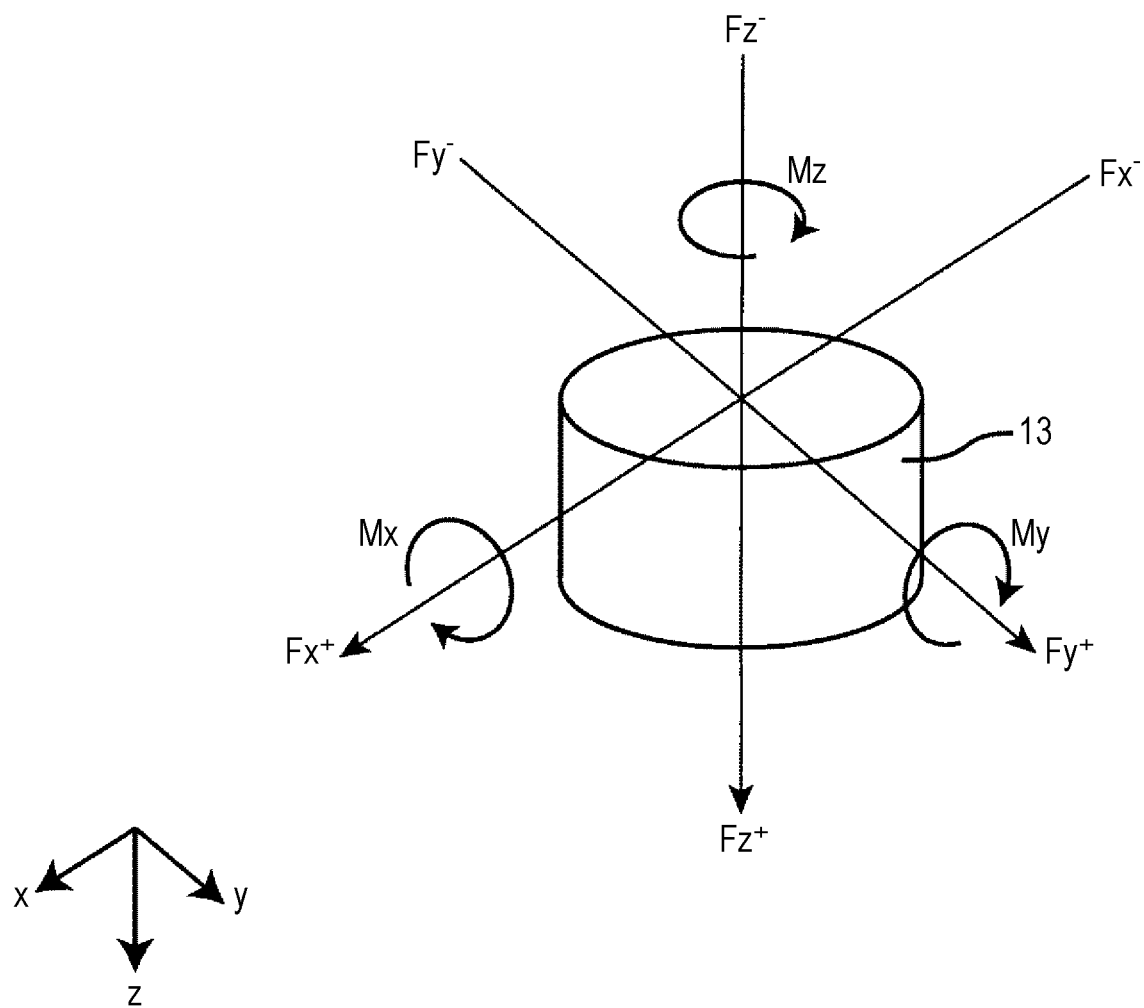
FIG. 3 is a diagram illustrating directions in which a detector detects a handle load according to the first embodiment of the present disclosure.

FIG. 3 illustrates directions in which the detector 13 detects the handle load. As illustrated in FIG. 3, the detector 13 is a six-axis force sensor capable of detecting forces along three axes perpendicular to one another and moments about the three axes. The three axes perpendicular to one another are an x-axis extending in a lateral direction of the robot 1, a y-axis extending in a longitudinal direction of the robot 1, and a z-axis extending in a height direction of the robot 1. The forces along the three axes are a force Fx along the x-axis, a force Fy along the y-axis, and a force Fz along the z-axis. In the first embodiment, a force Fx applied rightward is denoted by Fx+, and a force Fx applied leftward is denoted by Fx−. A force Fy applied forward is denoted by Fy+, and a force Fy applied rearward is denoted by Fy−. A force Fz applied downward relative to a road surface is denoted by Fz+, and a force Fz applied upward relative to the road surface is denoted by Fz−. The moments about the three axes are a moment Mx about the x-axis, a moment My about the y-axis, and a moment Mz about the z-axis.

The movement device 14 moves the body 11 on the basis of the magnitude and direction of the handle load (the forces and the moments) detected by the detector 13. In the first embodiment, the movement device 14 performs types of control that will be described hereinafter. It is to be noted that Fx, Fy, Fz, Mx, My, and Mz might be referred to as "loads".

Forward Movement

If the detector 13 detects the force Fy+, the movement device 14 moves the body 11 forward. That is, if the detector 13 detects the force Fy+, the robot 1 moves forward. If the force Fy+ detected by the detector 13 increases while the robot 1 is moving forward, the movement device 14 moves the robot 1 forward faster. On the other hand, if the force Fy+ detected by the detector 13 decreases while the robot 1 is moving forward, the movement device 14 moves the robot 1 forward slower.

Rearward Movement

If the detector 13 detects the force Fy−, the movement device 14 moves the body 11 rearward. That is, if the detector 13 detects the force Fy−, the robot 1 moves rearward. If the force Fy− detected by the detector 13 increases while the robot 1 is moving rearward, the movement device 14 moves the robot 1 rearward faster. On the other hand, if the force Fy− detected by the detector 13 decreases while the robot 1 is moving rearward, the movement device 14 moves the robot 1 rearward slower.

Right-Turn Movement

If the detector 13 detects the force Fy+ and a moment Mz+, the movement device 14 turns the body 11 right. That is, if the detector 13 detects the force Fy+ and the moment Mz+, the robot 1 turns right. If the moment Mz+ detected by the detector 13 increases while the robot 1 is turning right, a radius with which the robot 1 turns decreases. If the force Fy+ detected by the detector 13 increases while the robot 1 is turning right, speed at which the robot 1 turns increases.

Left-Turn Movement

If the detector 13 detects the force Fy+ and a moment Mz−, the movement device 14 turns the body 11 left. That is, if the detector 13 detects the force Fy+ and the moment Mz−, the robot 1 turns left. If the moment Mz− detected by the detector 13 increases while the robot 1 is turning left, a radius with which the robot 1 turns decreases. If the force Fy+ detected by the detector 13 increases while the robot 1 is turning left, speed at which the robot 1 turns increases.

The type of control performed by the movement device 14 is not limited to the above example. For example, the movement device 14 may move the robot 1 forward or rearward on the basis of the forces Fy and Fz. In addition, for example, the movement device 14 may turn the robot 1 on the basis of the moments Mx and My.

Although the detector 13 is a six-axis force sensor in the first embodiment, the detector 13 is not limited to a six-axis force sensor. For example, the detector 13 may be a three-axis sensor or a strain sensor, instead.

The movement device 14 includes wheels 16, which are rotation members provided in a lower part of the body 11, and a driving unit 17 that drives the wheels 16.

The wheels 16 keep the body 11 upright and move, when rotationally driven by the driving unit 17, the body 11 in a direction (forward or rearward) indicated by an arrow illustrated in FIG. 2, for example, while keeping the body 11 upright. Although the movement device 14 includes a movement mechanism employing the two wheels 16 in the first embodiment, a rotation member other than wheels (a moving belt, a roller, or the like) may be used, instead.

The driving unit 17 includes a load correction section 18, a user movement intention estimation section 19, a driving force calculation section 20, an actuator control section 21, and an actuator 22.

The load correction section 18 corrects the handle load detected by the detector 13 on the basis of the user's load tendency. More specifically, the load correction section 18 corrects the handle load detected by the detector 13 on the basis of load tendency data generated by the load tendency data generation unit 15. In the first embodiment, the load correction section 18 calculates a fluctuation frequency from past handle load data at a time when the user was walking, and corrects the handle load by filtering the fluctuation frequency of the handle load detected by the detector 13. The load correction section 18 may also correct the handle load on the basis of a place where the robot 1 is used, how long the robot 1 has been used, the user's physical condition, or the like.

The user movement intention estimation section 19 estimates the user's intended type of movement on the basis of the handle load corrected by the load correction section 18

(hereinafter referred to as a "corrected handle load"). The user's intended type of movement includes a movement direction and a movement speed. In the first embodiment, the user movement intention estimation section 19 estimates the user's intended type of movement from the forces and the moments included in the corrected handle load in each movement direction. If the force Fy+ detected by the detector 13 is equal to or larger than a first threshold and a moment My+ is smaller than a second threshold, for example, the user movement intention estimation section 19 may estimate that the user's intended type of movement is forward movement. In addition, the user movement intention estimation section 19 may estimate a movement speed on the basis of the force Fz included in the corrected handle load. On the other hand, if the force Fy+ detected by the detector 13 is equal to or larger than a third threshold and the moment My+ is equal to or larger than the second threshold, the user movement intention estimation section 19 may estimate that the user's intended type of movement is right-turn movement. In addition, the user movement intention estimation section 19 may estimate a turning speed on the basis of the force Fz included in the corrected handle load and a turning radius on the basis of the moment My included in the corrected handle load.

The driving force calculation section 20 calculates driving forces on the basis of information regarding the handle load corrected by the load correction section 18. More specifically, the driving force calculation section 20 calculates the driving forces on the basis of the user's intended type of movement estimated from the information regarding the corrected handle load, that is, the user's movement direction and movement speed. If the user's intended type of movement is forward movement or rearward movement, for example, the driving force calculation section 20 calculates the driving forces such that rotation speeds of the two wheels 16 become the same. If the user's intended type of movement is right-turn movement, the driving force calculation section 20 calculates the driving forces such that the rotation speed of the right wheel 16 becomes higher than that of the left wheel 16. In addition, the driving force calculation section 20 calculates the driving forces on the basis of the user's movement speed.

The actuator control section 21 drives the actuator 22 on the basis of information regarding the driving forces calculated by the driving force calculation section 20. In addition, the actuator control section 21 can obtain information regarding the rotation speeds of the wheels 16 from the actuator 22 and transmit the information regarding the rotation speeds of the wheels 16 to the driving force calculation section 20 and a user load tendency extraction section 23.

The actuator 22 is, for example, a motor that rotates the wheels 16. The actuator 22 is connected to the wheels 16 through gears, pulleys, or the like. The actuator 22 is driven by the actuator control section 21 and rotates the wheels 16.

The load tendency data generation unit 15 generates the user's load tendency data on the basis of information regarding handle loads detected in the past. The load tendency data is data indicating the tendency of the user's handle loads in certain types of movement. The certain types of movement include, for example, forward movement, rearward movement, and turn movement. If the user has a bent back, for example, the user might lean on the handle 12 of the robot 1, and the handle load vertically downward relative to the road surface on which the robot 1 moves, that is, the force Fz+, tends to become large. If the user staggers while holding the handle 12, for example, the handle load in the lateral direction, that is, the moment My, tends to increase even if the user is moving forward. The load tendency data generation unit 15 thus generates the user's load tendency in each type of movement from the past load data.

Control Components of Walking Assist Robot

Figure 4:
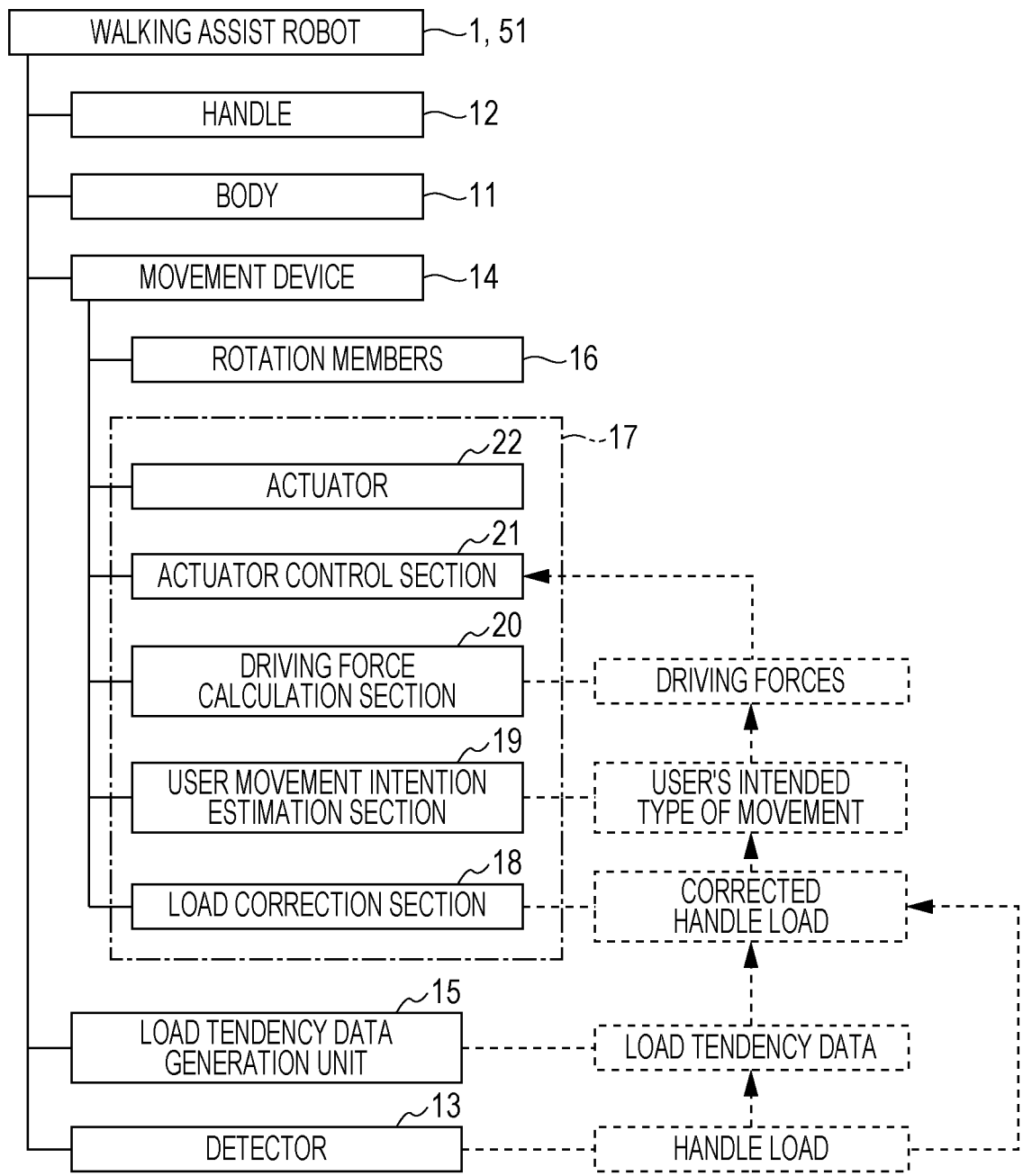
FIG. 4 is a control block diagram illustrating main control components of the walking assist robot according to the first embodiment of the present disclosure.

The walking assist robot 1 having the above configuration includes the following control components for assisting the user in walking. FIG. 4 is a control block diagram illustrating main control components of the robot 1. The control block diagram of FIG. 4 also illustrates a relationship between the control components and information handled by the control components.

As illustrated in FIG. 4, the detector 13 detects the handle load applied to the handle 12. Information regarding the handle load detected by the detector 13 is transmitted to the load correction section 18. The load correction section 18 corrects the handle load detected by the detector 13 on the basis of the load tendency data generated by the load tendency data generation unit 15. Information regarding the corrected handle load is transmitted to the user movement intention estimation section 19. The user movement intention estimation section 19 estimates the user's intended type of movement (the movement direction and the movement speed) on the basis of the corrected information regarding the corrected handle load. Information regarding the estimated intended type of movement of the user is transmitted to the driving force calculation section 20. The driving force calculation section 20 calculates the driving forces on the basis of the information regarding the estimated intended type of movement of the user. Information regarding the calculated driving forces is transmitted to the actuator control section 21. The actuator control section 21 drives the actuator 22 on the basis of the information regarding the driving forces calculated by the driving force calculation section 20. The actuator 22 is driven by the actuator control section 21 and rotates the wheels 16 to move the body 11.

As illustrated in FIG. 4, the information regarding the handle load detected by the detector 13 is also transmitted to the load tendency data generation unit 15. The information regarding the handle load detected by the detector 13 is also used to generate and update the load tendency data.

Figure 5:
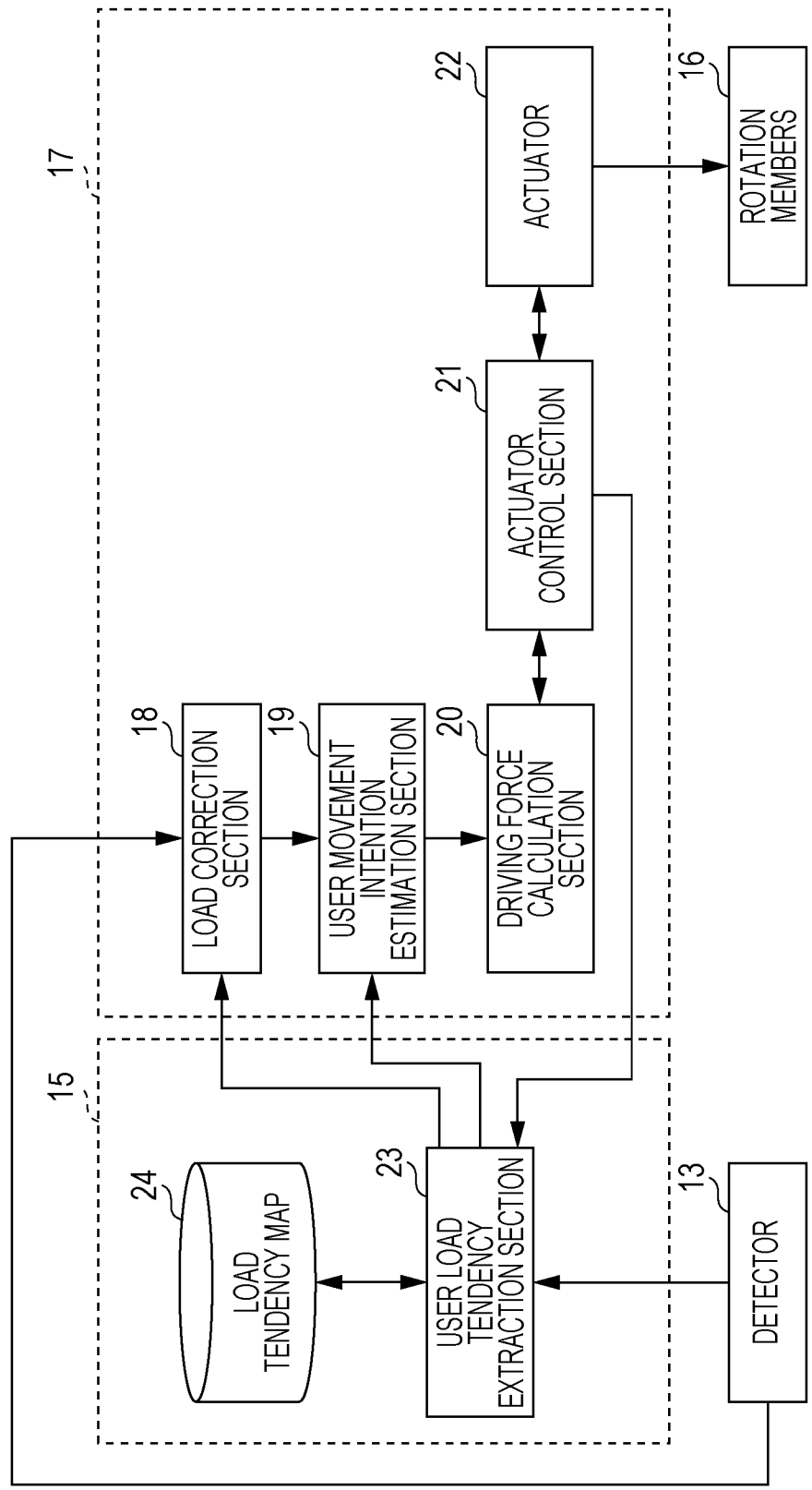
FIG. 5 is a control block diagram illustrating control components of the walking assist robot for assisting the user in walking according to the first embodiment of the present disclosure.

Details of control operations performed by the robot 1 to assist the user in walking will be described with reference to FIG. 5. FIG. 5 is a control block diagram illustrating detailed control components of the robot 1 for assisting the user in walking.

As illustrated in FIG. 5, the load tendency data generation unit 15 includes the user load tendency extraction section 23 that extracts the user's load tendency corresponding to the type of movement of the user and a load tendency map 24 that stores the user's load tendency data.

The user load tendency extraction section 23 extracts the user's load tendency corresponding to the type of movement of the user. More specifically, the user load tendency extraction section 23 extracts the user's load tendency data corresponding to the type of movement of the user from the load tendency map 24. If the user is moving forward, for example, the user load tendency extraction section 23 extracts the user's load tendency corresponding to the forward movement from the load tendency map 24. The user load tendency extraction section 23 transmits the load tendency data extracted from the load tendency map 24 to the load correction section 18.

In addition, the user load tendency extraction section 23 generates the user's load tendency data on the basis of the information regarding the handle load detected by the detector 13 and the information regarding the rotation speeds of the wheels 16 obtained by the actuator control section 21. The generated load tendency data is transmitted to the load tendency map 24. As a result, the load tendency data stored in the load tendency map 24 is updated.

The load tendency map 24 is a database storing the user's load tendency data corresponding to each type of movement of the user. The load tendency map 24 stores the user's load tendency data for each type of movement of the user. FIG. 6 illustrates the load tendency map 24. As illustrated in FIG. 6, in the first embodiment, the load tendency map 24 stores fluctuation frequencies in the movement direction during walking and fluctuation frequencies in a center of gravity offset direction during walking as the user's load tendency data. The load tendency map 24 may also store data regarding fluctuation frequencies calculated in the past.

Although not illustrated in FIG. 6, the load tendency map 24 may also store data such as the place where the robot 1 is used, how long the robot 1 has been used, and the user's physical condition. These pieces of data may be used when the load correction section 18 corrects the handle load.

Generation of Load Tendency Data

Figure 7:
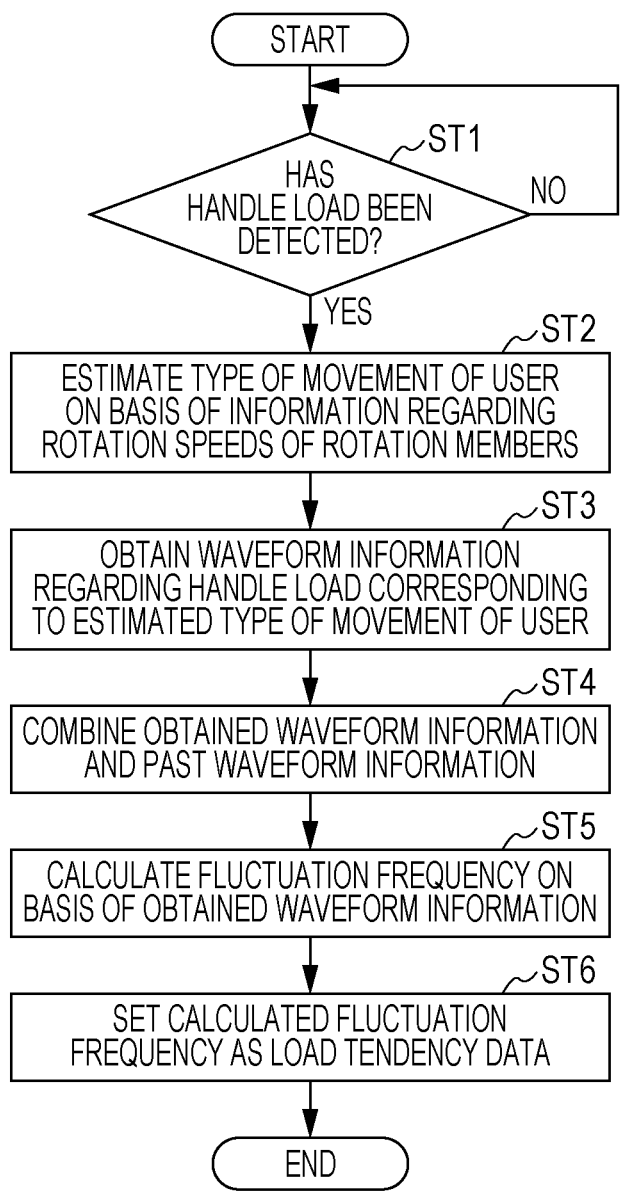
FIG. 7 is an exemplary flowchart illustrating a process for generating load tendency data performed by the walking assist robot according to the first embodiment of the present disclosure.

The generation of the load tendency data will be described with reference to FIG. 7. FIG. 7 is an exemplary flowchart illustrating a process for generating the load tendency data.

As illustrated in FIG. 7, in step ST1, it is determined whether the detector 13 has detected a handle load. In step ST1, whether the user is holding the handle 12 is determined. If the detector 13 detects a handle load, the process proceeds to step ST2. If the detector 13 does not detect a handle load, step ST1 is repeated.

In step ST2, the user load tendency extraction section 23 estimates the type of movement of the user on the basis of information regarding the rotation speeds of the wheels 16. More specifically, after a change in the handle load is detected in step ST1, the actuator control section 21 obtains the information regarding the rotation speeds of the wheels 16. The information regarding the rotation speeds obtained by the actuator control section 21 is transmitted to the user load tendency extraction section 23. The user load tendency extraction section 23 estimates the type of movement of the user on the basis of the information regarding the rotation speeds of the wheels 16, that is, rotation directions and the number of rotations of the wheels 16. In the first embodiment, the user load tendency extraction section 23 estimates the type of movement of the user on the basis of the left and right wheels 16. If the rotation speed of the right wheel 16 is higher than the rotation speed of the left wheel 16, for example, the user load tendency extraction section 23 may estimate that the user is turning left. If the number of rotations of the left and right wheels 16 is the same and the wheels 16 are rotating forward, on the other hand, the user load tendency extraction section 23 may estimate that the robot 1 is moving forward.

In step ST3, the user load tendency extraction section 23 obtains waveform information regarding the handle load corresponding to the estimated type of movement of the user. The waveform information regarding the handle load corresponding to the type of movement of the user is not particularly limited, but, if the user is applying the force Fy+, for example, the waveform information may be waveform information regarding the force Fz or the moment My included in the handle load or the like.

In step ST4, the user load tendency extraction section 23 combines the obtained waveform information regarding the handle load and waveform information regarding past handle loads. The past waveform information is, for example, stored in the load tendency map 24. The user load tendency extraction section 23 reads the past waveform information from the load tendency map 24 and adds the obtained current waveform information to the past waveform information. FIG. 8 illustrates an example of input waveform information regarding handle loads. As illustrated in FIG. 8, waveform information regarding handle loads detected so far is stored in the load tendency map 24.

In step ST5, the user load tendency extraction section 23 calculates a fluctuation frequency on the basis of the obtained waveform information. More specifically, the user load tendency extraction section 23 conducts a frequency analysis on the handle load corresponding to the estimated type of movement of the user.

Figure 9A:
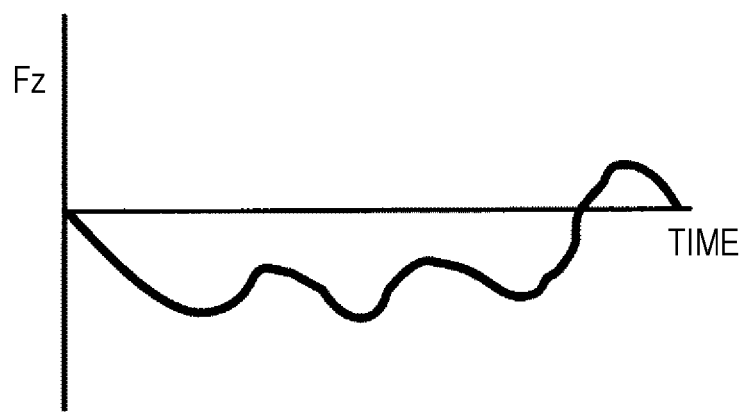
FIG. 9A is a diagram illustrating an example of waveform information regarding a force included in load data at a time when the user is moving forward.
Figure 9B:
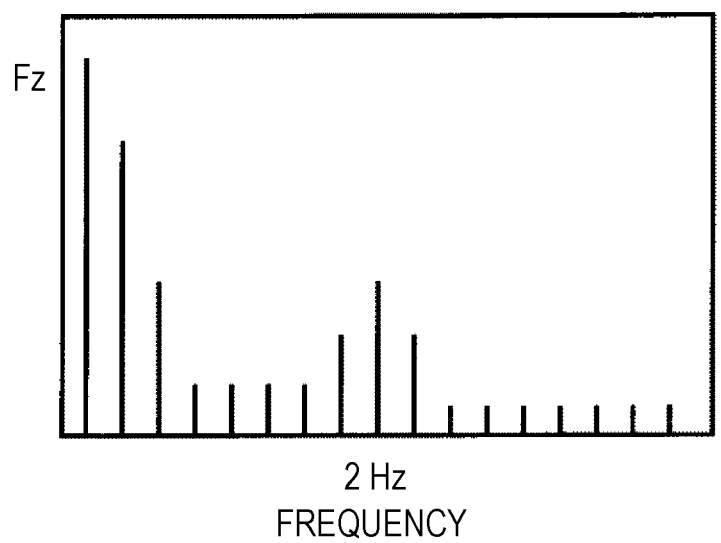
FIG. 9B is a diagram illustrating a frequency component of the force included in the load data illustrated in FIG. 9A.
Figure 10A:
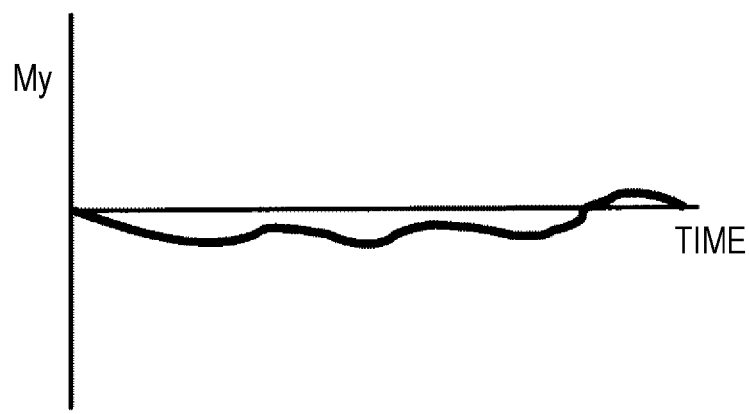
FIG. 10A is a diagram illustrating an example of waveform information regarding a moment included in the load data at a time when the user is moving forward.
Figure 10B:
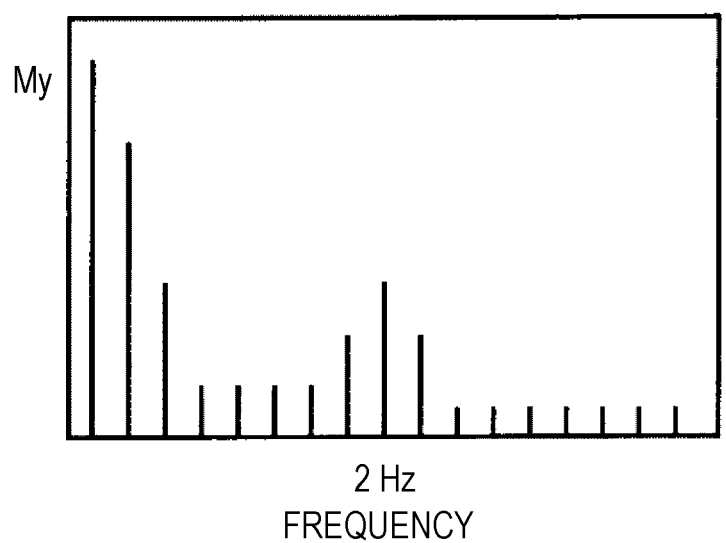
FIG. 10B is a diagram illustrating a frequency component of the moment included in the load data illustrated in FIG. 10A.

As an example, calculation of a fluctuation frequency when a user whose level of physical ability is low is moving forward will be described. FIG. 9A illustrates an example of waveform information regarding the force Fz included in load data at a time when the user is moving forward. FIG. 9B illustrates a frequency component of the force Fz included in the load data illustrated in FIG. 9A. FIG. 10A illustrates an example of waveform information regarding the moment My included in the load data at a time when the user is moving forward. FIG. 10B illustrates a frequency component of the moment My included in the load data illustrated in FIG. 10A. Although FIG. 9A illustrates a waveform of load data regarding three steps, a frequency analysis is conducted on a waveform of load data regarding a dozen of steps in practice.

Since a user whose level of physical ability is low staggers, the handle load is not stable even if the user is walking forward at constant speed. As illustrated in FIG. 9A, therefore, waveform information in the height direction of the robot 1, that is, the waveform information regarding the force Fz included in the load data, fluctuates. Fluctuation refers to a component in which waveform information is not stable, and more specifically to variation from an average value of load data.

In this case, although the user desires to walk forward, the robot 1 moves to the left and right, and the user needs to walk while constantly adjusting his/her movement direction to the left and right. In the first embodiment, the user load tendency extraction section 23 estimates that the user is staggering, and uses the fluctuation component of the handle load as the load tendency data in order to correct the handle load. An example of a process performed by the user load tendency extraction section 23 will be described hereinafter.

The user load tendency extraction section 23 conducts a frequency analysis on the waveform information regarding the force Fz included in the load data illustrated in FIG. 9A to calculate the frequency component of the force Fz included in the load data illustrated in FIG. 9B. As a result, as illustrated in FIG. 9B, the user load tendency extraction section 23 can identify a fluctuation frequency of 2 Hz in the force Fz while the user is moving forward.

In the case of a user whose level of physical ability is low, the waveform information regarding the moment My included in the load data, too, fluctuates as illustrated in FIG. 10A. The user load tendency extraction section 23 conducts a frequency analysis on the moment My included in the load data illustrated in FIG. 10A to calculate the frequency component of the moment My included in the load data illustrated in FIG. 10B. As a result, as illustrated in FIG. 10B, the user load tendency extraction section 23 can identify a fluctuation frequency of 2 Hz in the moment My while the user is moving forward.

Figure 11A:
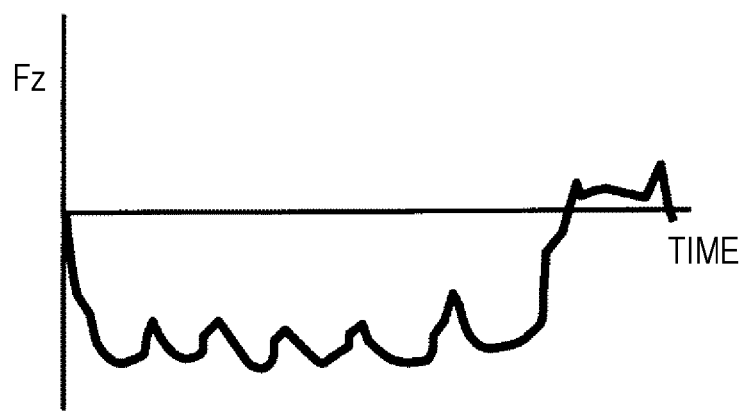
FIG. 11A is a diagram illustrating an example of waveform information regarding the force included in load data at a time when the user is turning right.
Figure 11B:
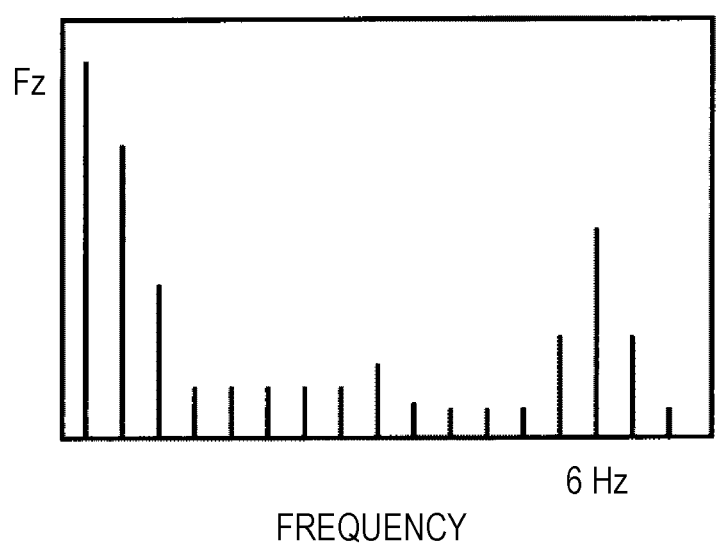
FIG. 11B is a diagram illustrating a frequency component of the force included in the load data illustrated in FIG. 11A.

As another example, calculation of a fluctuation frequency at a time when a user whose level of physical ability is low is turning right will be described. FIG. 11A illustrates an example of waveform information regarding the force Fz included in load data at a time when the user is turning right. FIG. 11B illustrates a frequency component of the force Fz included in the load data illustrated in FIG. 11A.

As illustrated in FIG. 11A, the waveform information regarding the force Fz included in the load data fluctuates while the user whose level of physical ability is low is turning right. The user load tendency extraction section 23 conducts a frequency analysis on the force Fz included in the load data illustrated in FIG. 11A to calculate the frequency component of the force Fz included in the load data illustrated in FIG. 11B. As illustrated in FIG. 11B, the user load tendency extraction section 23 can identify a fluctuation frequency of 6 Hz in the force Fz included in the load data while the user is turning right.

The user load tendency extraction section 23 thus calculates, in step ST5, a fluctuation frequency from the obtained waveform information regarding the handle load corresponding to the estimated type of movement of the user.

In step ST6 illustrated in FIG. 7, the user load tendency extraction section 23 sets the fluctuation frequency calculated in step ST5 as load tendency data. More specifically, the user load tendency extraction section 23 updates the user's load tendency data stored in the load tendency map 24 with the fluctuation frequency calculated in step ST5.

As described above, in the first embodiment, the fluctuation frequency of the user's handle load can be calculated and used as the load tendency data by performing steps ST1 to ST6. In addition, in the first embodiment, load tendency data can be created for each movement operation.

Although an example in which a fluctuation frequency calculated on the basis of waveform information obtained by combining the obtained waveform regarding the handle load and the waveform information regarding the past handle loads is set as the load tendency data in steps ST4 and ST5 has been described, a type of load tendency data set is not limited to this. An average fluctuation frequency obtained by adding a fluctuation frequency calculated on the basis of the obtained waveform information regarding the handle load to fluctuation frequencies calculated on the basis of the past waveform information and performing averaging may be used as the load tendency data, instead. Alternatively, a median or a mode calculated on the basis of the fluctuation frequency calculated from the obtained waveform information regarding the handle load and the past fluctuation frequencies may be used as the load tendency data. Alternatively, an average, a median, and a mode of fluctuation frequencies may be combined and used as the load tendency data. Alternatively, a latest fluctuation frequency may be used as the load tendency data. The above-described load tendency data may be used differently depending on the situation or the purpose. For example, a latest fluctuation frequency may be used as the load tendency data for a user for whom a sufficient amount of past data regarding fluctuation frequencies is not stored in the load tendency map 24. On the other hand, an average, a median, or a mode of fluctuation frequencies may be used as the load tendency data for a user for whom a sufficient amount of past data regarding fluctuation frequencies is stored in the load tendency map 24.

Estimation of User's Intended Type of Movement

Figure 12:
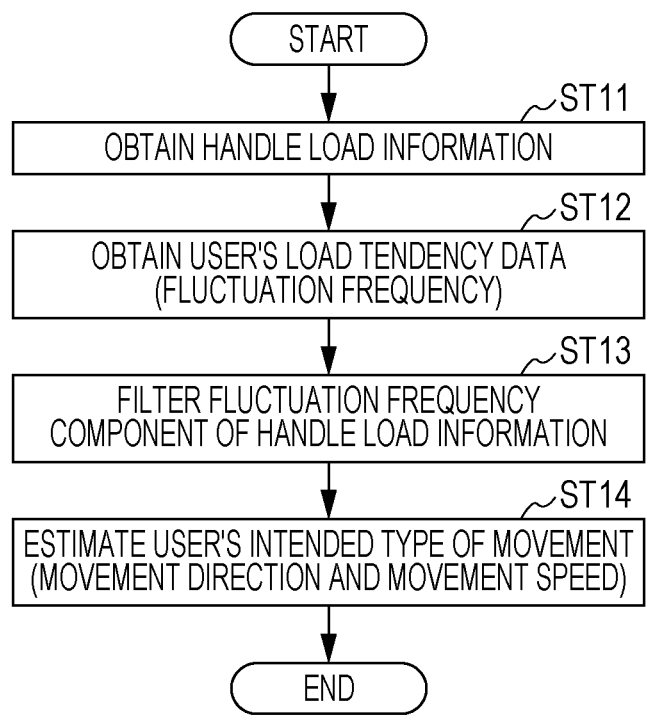
FIG. 12 is an exemplary flowchart illustrating a process for estimating the user's intended type of movement performed by the walking assist robot according to the first embodiment of the present disclosure.

The estimation of the user's intended type of movement will be described with reference to FIG. 12. FIG. 12 is an exemplary flowchart illustrating a process for estimating the user's intended type of movement.

As illustrated in FIG. 12, in step ST11, the load correction section 18 obtains information regarding a handle load detected by the detector 13.

In step ST12, the user load tendency extraction section 23 obtains the load tendency data from the load tendency map 24. More specifically, the user load tendency extraction section 23 obtains a fluctuation frequency corresponding to a current type of movement of the user from the load tendency map 24. The user load tendency extraction section 23 transmits information regarding the fluctuation frequency to the load correction section 18 as the load tendency data. The current type of movement of the user can be estimated by obtaining information regarding the rotation speeds of the wheels 16 from the actuator control section 21.

In step ST13, the load correction section 18 filters a fluctuation frequency component, which has been obtained in step ST12, of the handle load, which has been obtained in step ST11. As a result, the load correction section 18 corrects the handle load detected by the detector 13. Information regarding the corrected handle load obtained by the load correction section 18 is transmitted to the user movement intention estimation section 19.

Alternatively, the load correction section 18 may correct the handle load on the basis of the place where the robot 1 is used, how long the robot 1 has been used, and the user's physical condition. In this case, the user load tendency extraction section 23 extracts, from the load tendency map 24, data regarding the place where the robot 1 is used, how long the robot 1 has been used, and the user's physical condition, and transmits the data to the load correction section 18. The load correction section 18 may correct the handle load such that, for example, the handle load when the robot 1 is used in a living room or when the user's physical condition is not good becomes smaller than when the robot 1 is used in a hall or when the user's physical condition is good.

In step ST14, the user movement intention estimation section 19 estimates the user's intended type of movement on the basis of the corrected handle load obtained in step ST13. More specifically, the user movement intention estimation section 19 estimates the user's movement direction and movement speed on the basis of the forces Fx, Fy, and Fz and the moments Mx, My, and Mz included in the corrected handle load.

As described above, in the first embodiment, a fluctuation frequency component of waveform information regarding the user's handle load is filtered and the user's intended type of movement is estimated on the basis of obtained information regarding a corrected handle load by performing the processing in steps ST11 to ST14.

In the filtering according to the first embodiment, the entirety of a frequency component corresponding to a fluctuation component may be removed, or a ratio of the fluctuation component to load data during walking may be reduced.

In addition, the load correction section 18 need not perform the correction using only the user's load tendency data. The load correction section 18 may compare the user's load tendency data with average load tendency data regarding a plurality of users and change a degree of correction in such a way as to reduce a differential component. The average load tendency data regarding a plurality of users may be calculated for each of groups classified in accordance with a combination of age, gender, places, levels of walking ability (walking speed, pace, stride, carriage, and a stagger), and/or the like.

Figure 13A:
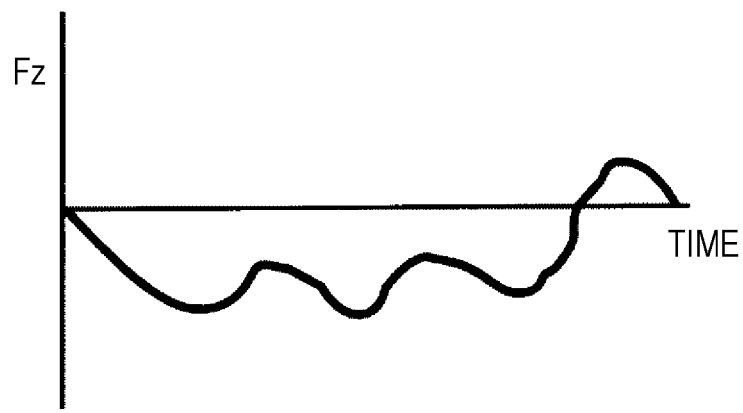
FIG. 13A is a diagram illustrating an example of waveform information regarding the force included in load data at a time when the user is moving forward.
Figure 13B:
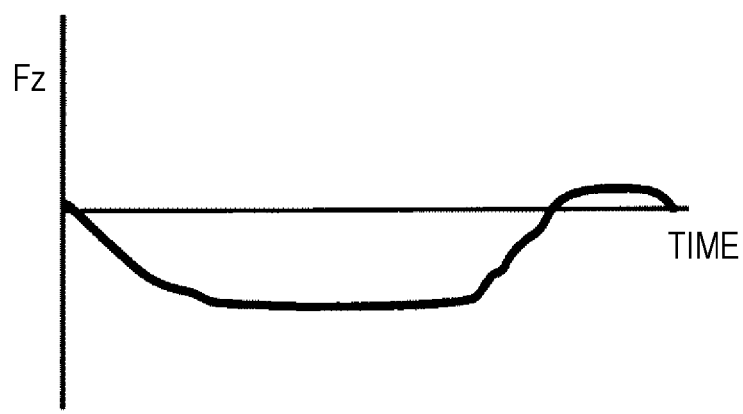
FIG. 13B is a diagram illustrating waveform information obtained by filtering a fluctuation frequency component of the waveform information regarding the force included in the load data illustrated in FIG. 13A.
Figure 14A:
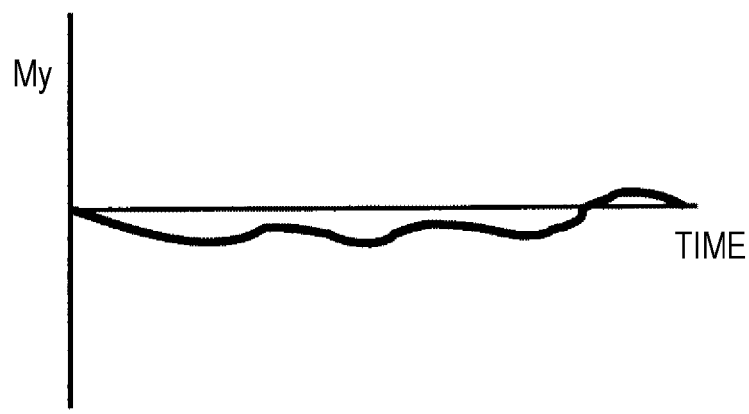
FIG. 14A is a diagram illustrating an example of waveform information regarding the moment included in the load data at a time when the user is moving forward.
Figure 14B:
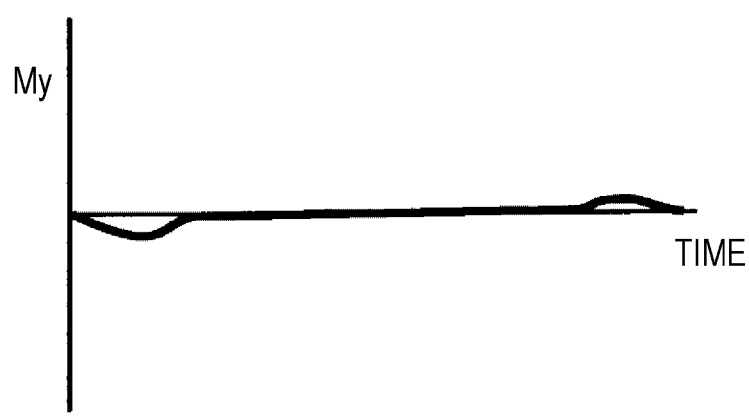
FIG. 14B is a diagram illustrating waveform information obtained by filtering a fluctuation frequency component of the waveform information regarding the moment included in the load data illustrated in FIG. 14A.

As an example, a process for estimating an intended type of movement of a user whose level of physical ability is low will be described. FIG. 13A illustrates an example of waveform information regarding the force Fz included in load data at a time when the user is moving forward. FIG. 13B illustrates waveform information obtained by filtering a fluctuation frequency component of the waveform information regarding the force Fz included in the load data illustrated in FIG. 13A. FIG. 14A illustrates an example of waveform information regarding the moment My included in the load data at a time when the user is moving forward. FIG. 14B illustrates waveform information obtained by filtering a fluctuation frequency component of the waveform information regarding the moment My included in the load data illustrated in FIG. 14A. The waveform information illustrated in FIGS. 13A and 14A is waveform information regarding handle loads obtained in steps ST11. The waveform information illustrated in FIGS. 13B and 14B is waveform information regarding corrected handle loads obtained by filtering the fluctuation frequency components in step ST13.

As illustrated in FIG. 13A, the user whose level of physical ability is low staggers, and there is a fluctuation in the waveform information regarding the force Fz included in the load data while the user is moving forward. That is, the force Fz included in the handle load detected by the detector 13 while the user is moving forward varies. The load correction section 18 filters the fluctuation frequency component of the waveform information regarding the force Fz included in the handle load obtained by the detector 13. As a result, as illustrated in FIG. 13B, the fluctuation in the waveform information regarding the force Fz included in the handle load while the user is moving forward can be removed. As a result, the user movement intention estimation section 19 can easily estimate, on the basis of the corrected handle load, that the user's intended type of movement is forward movement.

In addition, as illustrated in FIG. 14A, there is a fluctuation in the waveform information regarding the moment My included in the load data while the user whose level of physical ability is low is moving forward. That is, the moment My included in the handle load detected by the detector 13 varies while the user is moving forward. The load correction section 18 filters a fluctuation frequency component of the waveform information regarding the moment My included in the handle load obtained by the detector 13. As a result, as illustrated in FIG. 14B, the fluctuation in the waveform information regarding the moment My included in the handle load while the user is moving forward can be removed. As a result, the user movement intention estimation section 19 can easily estimate, on the basis of the corrected handle load, that the user's intended type of movement is forward movement.

In addition, the user movement intention estimation section 19 may estimate a turning radius at a time when the user turns. For example, a large turning radius may be set for a user whose legs are weak in order to turn the robot 1 slowly. On the other hand, a small turning radius may be set for a user who has strong legs in order to turn the robot 1 quickly. The turning radius is estimated, for example, from the corrected handle load.

In addition, the user movement intention estimation section 19 may obtain information regarding the rotation speeds of the wheels 16 from the actuator control section 21 and estimate the user's intended type of movement on the basis of the information regarding the rotation speeds and information regarding the corrected handle load.

Calculation of Driving Forces

Figure 15:
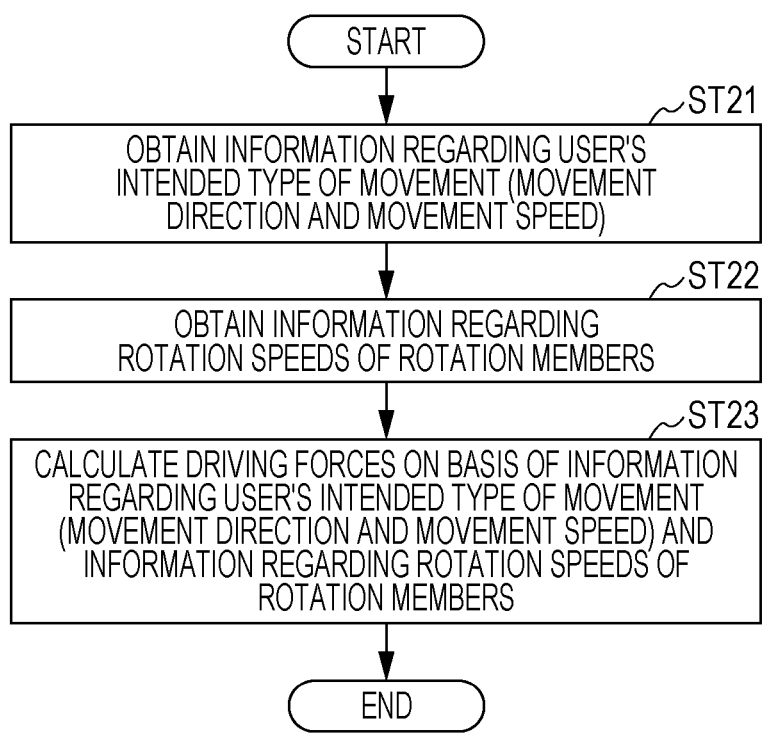
FIG. 15 is an exemplary flowchart illustrating a process for calculating driving forces performed by the walking assist robot according to the first embodiment of the present disclosure.

The calculation of the driving forces will be described with reference to FIG. 15. FIG. 15 is an exemplary flowchart illustrating a process for calculating the driving forces.

As illustrated in FIG. 15, in step ST21, the driving force calculation section 20 obtains information regarding the user's intended type of movement from the user movement intention estimation section 19.

In step ST22, the driving force calculation section 20 obtains information regarding the rotation speeds of the wheels 16 from the actuator control section 21.

In step ST23, the driving force calculation section 20 calculates the driving forces on the basis of the information regarding the user's intended type of movement obtained in step ST21 and the information regarding the rotation speeds of the wheels 16 obtained in step ST22. More specifically, the driving force calculation section 20 calculates the rotation speeds of the wheels 16 on the basis of differences between a current movement direction and a current movement speed calculated from the information regarding the rotation speeds of the wheels 16 and a movement direction and a movement speed estimated from the information regarding the user's intended type of movement.

As an example, the operation of the driving force calculation section 20 when the robot 1 is moving forward at a movement speed of 71 cm/s and the user increase the force Fy+ to increase the movement speed to 77 cm/s will be described. When the robot 1 is moving forward at a movement speed of 71 cm/s, the driving force calculation section 20 obtains information indicating that the rotation speeds of the left and right wheels 16 are 2,000 rpm. Next, the driving force calculation section 20 then calculates rotation speeds of the left and right wheels 16 necessary to increase the movement speed of the robot 1 to 77 cm/s as 2,500 rpm. The driving force calculation section 20 calculates the driving forces such that the rotation speeds of the left and right wheels 16 increase by 500 rpm.

Although the driving force calculation section 20 calculates the driving forces on the basis of information regarding the user's intended type of movement and information regarding the rotation speeds of the wheels 16 obtained from the actuator control section 21 in the first embodiment, the process for calculating the driving forces is not limited to this. For example, the driving force calculation section 20 may calculate the driving forces only on the basis of information regarding the user's intended type of movement, instead. That is, step ST22 may be omitted from the process for calculating the driving forces.

Alternatively, the driving force calculation section 20 may calculate the driving forces on the basis of a control table indicating correspondences between the handle load and the rotation speeds of the wheels 16. More specifically, the driving force calculation section 20 may include a storage portion storing the control table indicating correspondences between the handle load and the rotation speeds of the wheels 16. The driving force calculation section 20 may calculate the rotation speeds of the wheels 16 corresponding to the handle load detected by the detector 13 using the control table stored in the storage portion. In addition, the control table may be updated by correcting the handle load in the control table on the basis of the load tendency data extracted from the user load tendency extraction section 23.

Advantageous Effects

With the walking assist robot 1 according to the first embodiment, the following advantageous effects are produced.

With the walking assist robot 1 according to the first embodiment, the handle load can be corrected on the basis of the user's load tendency data. With this configuration, the robot 1 can correct the handle load in accordance with the user's tendency.

For example, in the case of a user who tends to stagger, the handle load is corrected by removing a fluctuation frequency due to the stagger from the handle load. Since the handle load can be corrected in accordance with the user's level of physical ability, the movement direction and movement speed of the robot 1 can be set for each of users who have different levels of physical ability. As a result, the robot 1 can be moved in accordance with the user's level of physical ability, and it becomes possible to assist the user in walking more comfortably.

In the first embodiment, the fluctuation frequency of the handle load is used as the load tendency data. By using the fluctuation frequency, the robot 1 can obtain various types of load tendency data regarding the user, that is, small and large fluctuations, from waveform information regarding the handle load in order to correct the handle load. As a result, the robot 1 can assist the user in walking more exactly in accordance with the user's level of physical ability.

In the first embodiment, for example, the load tendency data generation unit 15, the load correction section 18, the user movement intention estimation section 19, the driving force calculation section 20, and the actuator control section 21 may be achieved by including a memory (not illustrated) storing programs for achieving these components and a processing circuit (not illustrated) corresponding to a processor such as a central processing unit (CPU) and executing the programs using the processor, instead. Alternatively, the load tendency data generation unit 15, the load correction section 18, the user movement intention estimation section 19, the driving force calculation section 20, and the actuator control section 21 may be achieved using an integrated circuit for achieving these components.

Although the operation of the walking assist robot 1 has been mainly described in the first embodiment, the operation may be achieved as a method for assisting walking, instead.

Although a fluctuation frequency is set for each of the forces and the moments in the first embodiment, use of the fluctuation frequency is not limited to this. For example, a common fluctuation frequency may be set for all the forces, instead. As a result, the handle load can be corrected in a simple manner.

Although the rotation speeds of the two wheels 16 are set to achieve the forward movement, rearward movement, right-turn movement, and left-turn movement of the robot 1 in the first embodiment, a method for controlling the operation of the robot 1 is not limited to this. For example, a braking mechanism may be used to adjust the rotation speeds of the wheels 16 and control the operation of the robot 1, instead.

In the first embodiment, if the load tendency data corresponding to a movement operation of the robot 1 becomes equal to or higher than a certain threshold, the load correction section 18 may correct the handle load detected by the detector 13 on the basis of the load tendency data (filtering). If the moment Mz (fluctuation frequency) included in the load tendency data becomes equal to or higher than 0 Hz while the robot 1 is moving forward (application of the force Fy+), for example, the load data corresponding to the forward movement of the robot 1 may be corrected on the basis of the load tendency data. With this configuration, the fluctuation frequency of the moment Mz, which is unnecessary for the forward movement of the robot 1, can be filtered. The certain threshold may be changed in accordance with the user's level of physical ability. For example, the certain threshold may be changed to 1 Hz on the basis of information indicating that a fluctuation frequency of a healthy person is 1 Hz. In addition, the load tendency data corresponding to the movement operation of the robot 1 may be load tendency data corresponding to the type movement of the robot 1, or may be load tendency data that does not correspond to the type of movement of the robot 1. If load tendency data regarding another user is used as the certain threshold, for example, the user's load tendency data and the other user's load tendency data may be compared in terms of a type of movement corresponding to the movement operation of the robot 1.

Second Embodiment

A walking assist robot according to a second embodiment of the present disclosure will be described. In the second embodiment, differences from the first embodiment will be mainly described. In the second embodiment, the same or similar components as in the first embodiment are given the same reference numerals. In addition, in the second embodiment, description that has already been included in the first embodiment is omitted.

The second embodiment is different from the first embodiment in that an average load is used as the load tendency data. A walking assist robot 51 according to the second embodiment, which is illustrated in FIGS. 1, 2, and 4, includes the same components as those of the walking assist robot 1 according to the first embodiment.

FIG. 16 illustrates a load tendency map 24 according to the second embodiment. As illustrated in FIG. 16, the load tendency map 24 stores, as the load tendency data, an average load in the movement direction during walking and an average load in the center of gravity offset direction during walking for each type of movement of the user.

Generation of Load Tendency Data

Figure 17:
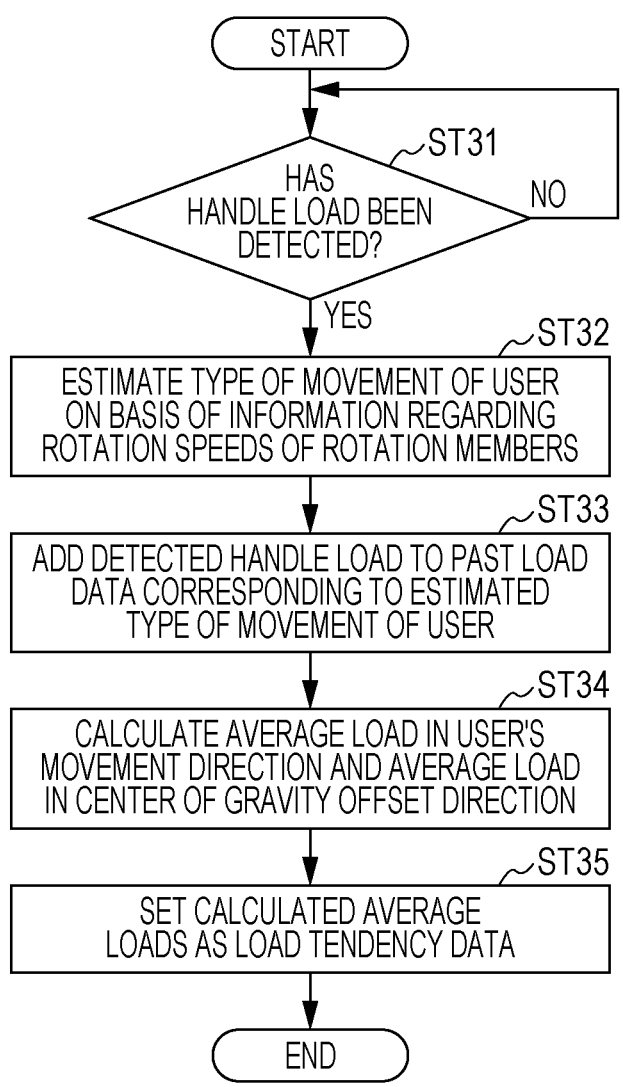
FIG. 17 is an exemplary flowchart illustrating a process for generating load tendency data performed by a walking assist robot according to a second embodiment of the present disclosure.

The generation of the load tendency data will be described with reference to FIG. 17. FIG. 17 is an exemplary flowchart illustrating a process for generating the load tendency data performed by the walking assist robot 51 (hereinafter referred to as a "robot 51").

As illustrated in FIG. 17, in step ST31, it is determined whether the detector 13 has detected a handle load. In step ST31, whether the user is holding the handle 12 is determined. If the detector 13 detects a handle load, the process proceeds to step ST32. If the detector 13 does not detect a handle load, step ST31 is repeated.

In step ST32, the user load tendency extraction section 23 estimates a current type of movement of the user on the basis of information regarding the rotation speeds of the wheels 16. More specifically, after the change is detected in step ST31, the actuator control section 21 obtains information regarding the rotation speeds of the wheels 16. The information regarding the rotation speeds obtained by the actuator control section 21 is transmitted to the user load tendency extraction section 23. For example, the user load tendency extraction section 23 estimates the type of movement of the user on the basis of the rotation speeds of the left and right wheels 16.

In step ST33, the user load tendency extraction section 23 adds the handle load detected in step ST31 to past load data corresponding to the estimated type of movement of the user. More specifically, the user load tendency extraction section 23 reads the past load data stored in the load tendency map 24 and adds the handle load detected in step ST31 to the read past load data. The past load data refers to all pieces of load data detected so far.

In step ST34, the user load tendency extraction section 23 calculates the average loads in the movement direction and the center of gravity offset direction at a time when the user is walking.

Figure 18:
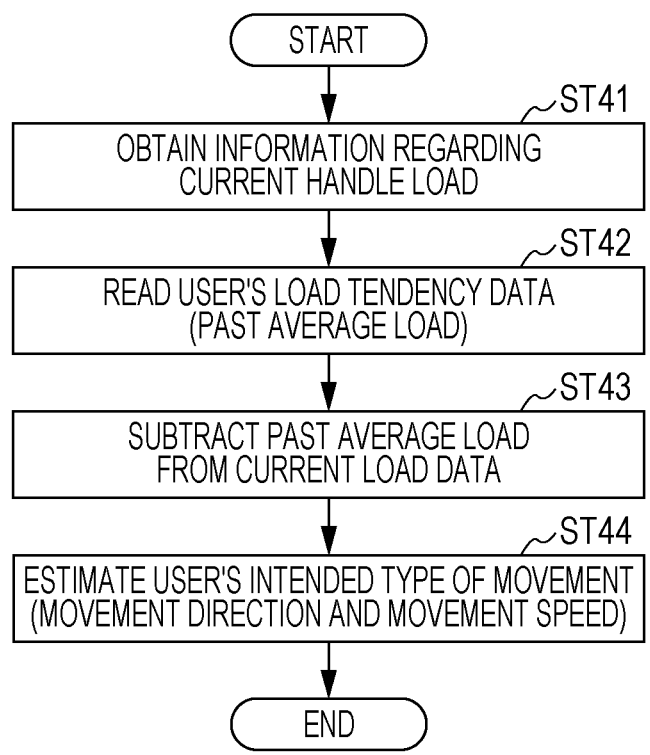
FIG. 18 is an exemplary flowchart illustrating a process for estimating the user's intended type of movement performed by the walking assist robot according to the second embodiment of the present disclosure.

In step ST35, the user load tendency extraction section 23 sets, as the load tendency data, the calculated average loads in the movement direction and the center of gravity offset direction at a time when the user is walking. More specifically, the user load tendency extraction section 23 transmits information regarding the calculated average loads to the load tendency map 24 to update the average loads in the movement direction and the center of gravity offset direction at a time when the user is walking stored in the load tendency map 24. Estimation of User's Intended Type of Movement The estimation of the user's intended type of movement will be described with reference to FIG. 18. FIG. 18 is an exemplary flowchart illustrating a process for estimating the user's intended type of movement.

As illustrated in FIG. 18, in step ST41, the load correction section 18 obtains information regarding a current handle load detected by the detector 13.

In step ST42, the user load tendency extraction section 23 reads the user's load tendency data. More specifically, the user load tendency extraction section 23 reads a past average load from the load tendency map 24 and transmits the past average load to the load correction section 18.

In step ST43, the load correction section 18 subtracts the past average load from the current load data. As a result, the load correction section 18 corrects the handle load.

In step ST44, the user movement intention estimation section 19 estimates the user's intended type of movement on the basis of information regarding the corrected handle load.

As an example, the correction of the handle load according to the second embodiment will be described. Here, the correction of a handle load of a user who walks with the center of gravity offset to the right.

Correction of Handle Load Using Average Load

Figure 19A:
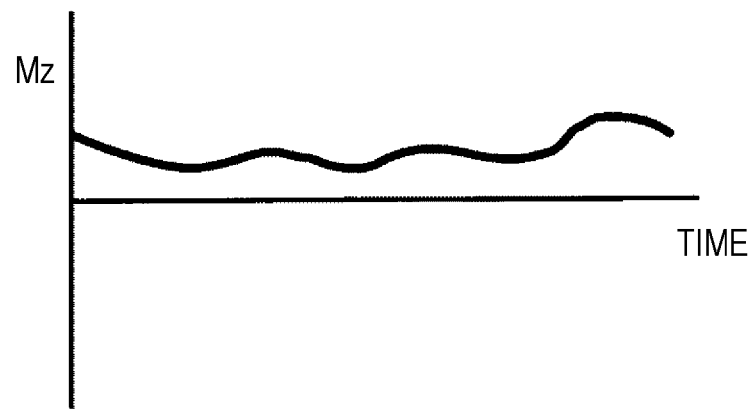
FIG. 19A is a diagram illustrating an example of waveform information regarding a moment included in current load data at a time when the user is moving forward.

FIG. 19A illustrates an example of waveform information regarding the moment Mz included in current load data at a time when the user is moving forward. As illustrated in FIG. 19A, since the center of gravity of the user is offset to the right, the detector 13 detects the moment Mz even while the user is moving forward.

Figure 19B:
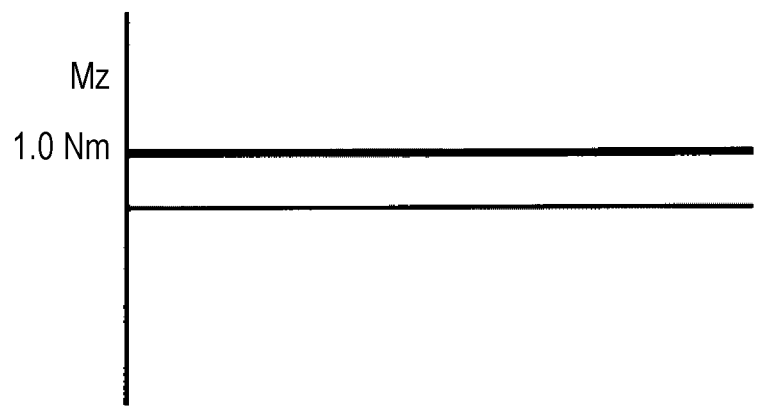
FIG. 19B is a diagram illustrating an average load of the moment included in past load data.

FIG. 19B illustrates an average load of the moment Mz included in past load data. The user load tendency extraction section 23 calculates the average load included in the past load data illustrated in FIG. 19B by averaging waveform information regarding the past load data. In FIG. 19B, the past average load of the moment Mz is 1.0 Nm. In the second embodiment, the average load illustrated in FIG. 19B is used as the load tendency data.

Figure 19C:
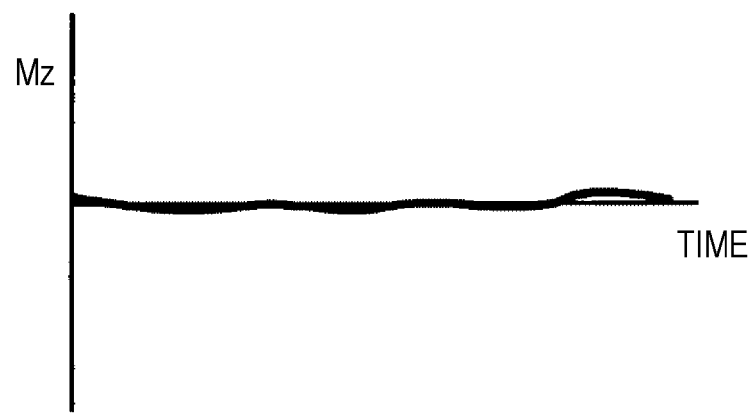
FIG. 19C is a diagram illustrating an example of the waveform information regarding corrected load data according to the second embodiment of the present disclosure.

Next, the load correction section 18 corrects the current load data on the basis of the load tendency data. More specifically, the load correction section 18 subtracts the past average load of the moment Mz of 1.0 Nm illustrated in FIG. 19B from the waveform information regarding the current load data illustrated in FIG. 19A. FIG. 19C illustrates the waveform information regarding the moment Mz included in the current load data corrected using the load tendency data. As illustrated in FIG. 19C, the moment Mz is generally reduced by subtracting the past average load from the current load data. As a result, the load correction section 18 can correct the offset of the load to the right.

The user movement intention estimation section 19 estimates the user's intended type of movement on the basis of information regarding the corrected current handle load. As a result, the robot 51 can operate while accurately estimating the user's intended type of movement, and the user need not constantly adjust the movement direction of the robot 51.

Although a user who walks with the center of gravity offset to the right has been taken in the above example of correction, the type of user is not limited to this. For example, a user who has a bent back might apply a large load downward. In this case, the handle load may be corrected using an average load of the force Fz.

If the robot 51 moves forward on the basis of the forces Fy and Fz included in the handle load, average loads of the forces Fy and Fz may be used as the load tendency data. That is, when the robot 51 is moving forward, the handle load may be corrected using the average loads of the forces Fy and Fz. If the robot 51 turns on the basis of the moment Mz included in the handle load, an average load of the moment Mz may be used as the load tendency data. That is, when the robot 51 is turning, the handle load may be corrected using the average load of the moment Mz. Alternatively, average loads of all the forces Fx, Fy, and Fz and all the moments Mx, My, and Mz may be calculated, and the handle load may be corrected using all the average loads. By correcting the handle load using average loads of a plurality of forces or moments in this manner, the user's load tendency can be detected more accurately, and the robot 51 can operate more appropriately in accordance with the user's level of physical ability. In the correction of the handle load, at least one of the average loads of the forces Fx, Fy, and Fz and the moments Mx, My and Mz may be calculated in accordance with a movement operation of the robot 51, and the handle load may be corrected using the calculated average load.

Advantageous Effects

With the walking assist robot 51 according to the second embodiment, the following advantageous effects are produced.

With the walking assist robot 51 according to the second embodiment, an average load included in the handle load is used as the user's load tendency data. With this configuration, the handle load can be corrected using a load constantly applied by each user as the user's load tendency data, and it becomes possible to assist the user in walking more appropriately in accordance with the user's level of physical ability. In addition, since an average load included in the handle load is used as the user's load tendency data, an error in the extraction of the user's load tendency is reduced.

In addition, although all handle loads detected in the past are used as the past load data when the load tendency data is calculated in the second embodiment, the past load data used is not limited to this. For example, the past load data used when the load tendency data is calculated may be load data detected in a certain period, instead. The certain period may be, for example, last one year. By using only relatively new load data, the user's current load tendency can be accurately extracted.

In the second embodiment, the load tendency map 24 may store load tendency data during stable walking. The user load tendency extraction section 23 may obtain the load tendency data from the load tendency map 24 and transmit the load tendency data during stable walking to the load correction section 18. The load correction section 18 may compare the load tendency data during stable walking and the user's current load data, and if these pieces of data are different from each other, the load correction section 18 may correct the handle load. If the force Fz included in the past load tendency data while the user was stably walking forward is 10 N, for example, and if the user is walking while inclining forward and the force Fz included in the handle load becomes 20 N, the load correction section 18 may correct the force Fz included in the handle load to the force Fz included in the handle load during stable walking. That is, the load correction section 18 may half the force Fz of 20 N.

Although the load correction section 18 corrects current load data by subtracting a past average load from the current load data in the second embodiment, the method for correcting current load data is not limited to this. For example, the load correction section 18 may take other parameters into consideration in order to correct the handle data in accordance with a place where the robot 51 is used, how long the robot 51 has been used, the user's physical condition, or the like.

If the robot 51 is moving on the basis of a combination of the forces Fz and Fy, the handle load may be corrected by changing a ratio of the forces Fz and Fy. For example, a ratio of the forces Fz and Fy of 8:2 may be changed to a ratio of the forces Fz and Fy of 6:4. The correction need not be performed using only the user's load tendency data, but the user's load tendency data and average load tendency data regarding a plurality of users may be compared, and the ratio may be changed in such a way as to reduce a difference. The average load tendency data regarding a plurality of users may be calculated for each of groups classified in accordance with a combination of age, gender, places, levels of walking ability (walking speed, pace, stride, carriage, and a stagger), and/or the like.

Alternatively, the load correction section 18 may correct the handle load by multiplying the current load data by a correction coefficient calculated from the past load tendency data. An example of the correction of the handle load using the correction coefficient will be described hereinafter.

Correction of Handle Load Using Correction Coefficient

Figure 20A:
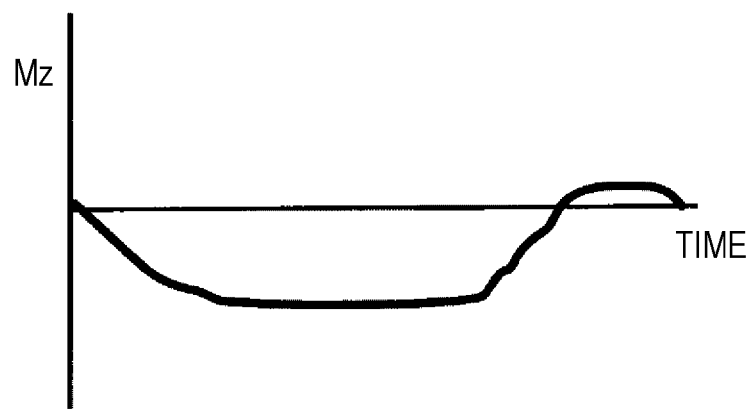
FIG. 20A is a diagram illustrating an example of waveform information regarding the moment included in past load data at a time when the user is moving forward.
Figure 20B:
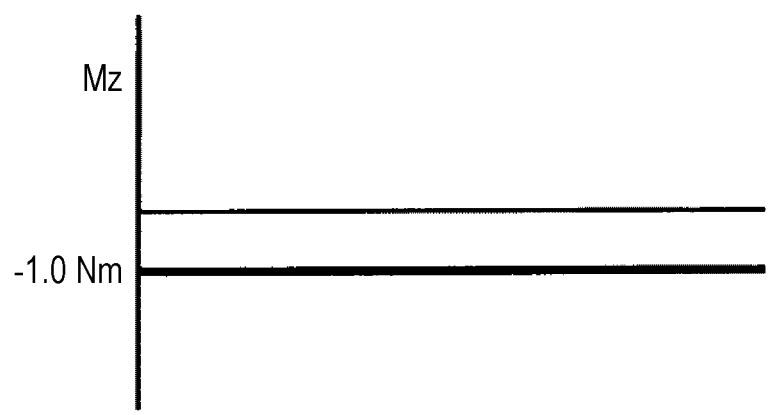
FIG. 20B is a diagram illustrating an average load of the moment included in the past load data illustrated in FIG. 20A.

FIG. 20A illustrates an example of waveform information regarding the moment Mz included in past load data at a time when the user is moving forward. FIG. 20B illustrates an average load of the moment Mz included in the past load data illustrated in FIG. 20A. The user load tendency extraction section 23 averages the waveform information regarding the past load data illustrated in FIG. 20A. As a result, the user load tendency extraction section 23 calculates the average load of the past load data illustrated in FIG. 20B as the load tendency data. In FIG. 20B, the past average load of the moment Mz is −1.0 Nm.

Figure 21A:
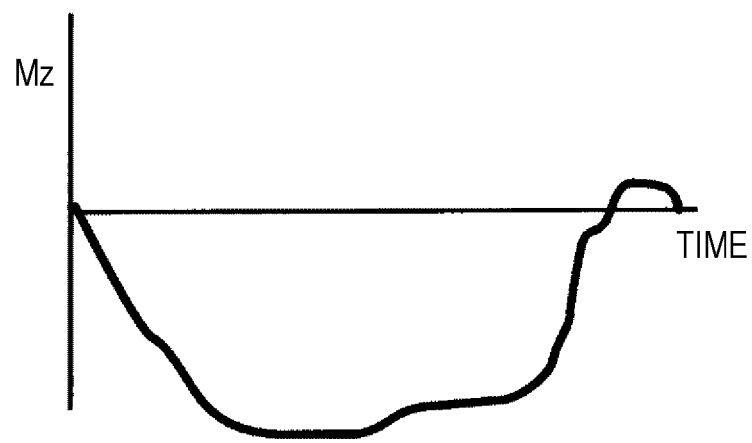
FIG. 21A is a diagram illustrating an example of waveform information regarding the moment included in the current load data at a time when the user is moving forward.
Figure 21B:
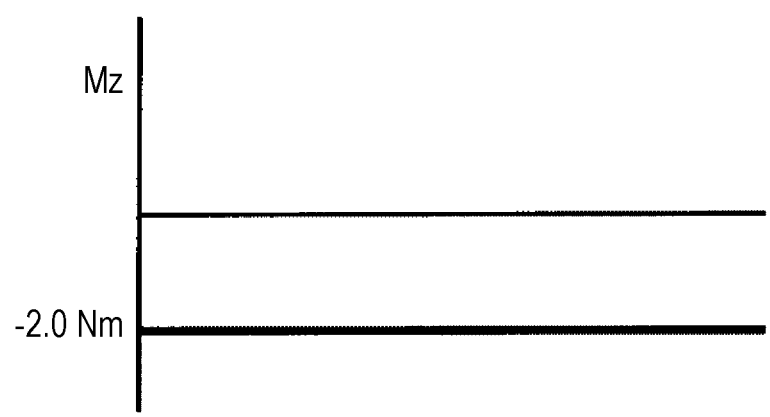
FIG. 21B is a diagram illustrating an average load of the moment included in the current load data illustrated in FIG. 21A.

Next, an average load is calculated from current load data. FIG. 21A illustrates an example of waveform information regarding the moment Mz included in the current load data at a time when the user is moving forward. FIG. 21B illustrates an average load of the moment Mz included in the current load data illustrated in FIG. 21A.

The load correction section 18 averages the waveform information regarding the current load data illustrated in FIG. 21A. As a result, the average load of the current load data illustrated in FIG. 21B is calculated. In FIG. 21B, the current average load of the moment Mz is −2.0 Nm.

The load correction section 18 calculates the correction coefficient by dividing the past average load by the current average load. In this case, the correction coefficient is (−1.0 Nm/−2.0 Nm)=0.5. The load correction section 18 corrects the handle load by multiplying the waveform information regarding the current load data by the correction coefficient. That is, the load correction section 18 corrects the moment Mz included in the handle load detected by the detector 13 by multiplying the waveform information regarding the current load data illustrated in FIG. 21A by the correction coefficient of 0.5.

Figure 22:
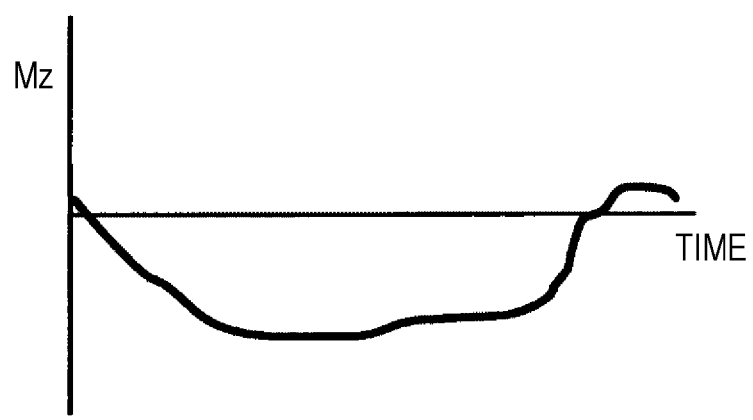
FIG. 22 is a diagram illustrating an example of waveform information regarding corrected load data according to the second embodiment of the present disclosure.

FIG. 22 illustrates an example of waveform information regarding the corrected load data. As illustrated in FIG. 22, the handle load detected by the detector 13 (refer to the waveform information illustrated in FIG. 21A) has been corrected through the multiplication using the correction coefficient. The load correction section 18 may thus correct the current handle load by multiplying current load data by a correction coefficient calculated on the basis of past load tendency data.

Third Embodiment

A walking assist robot according to a third embodiment of the present disclosure will be described. In the third embodiment, differences from the first and second embodiments will be mainly described. In the third embodiment, the same or similar components as in the first or second embodiment are given the same reference numerals. In addition, in the third embodiment, description that has already been included in the first or second embodiment is omitted.

The third embodiment is different from the first and second embodiments in that the load is corrected on the basis of physical information.

Figure 23:
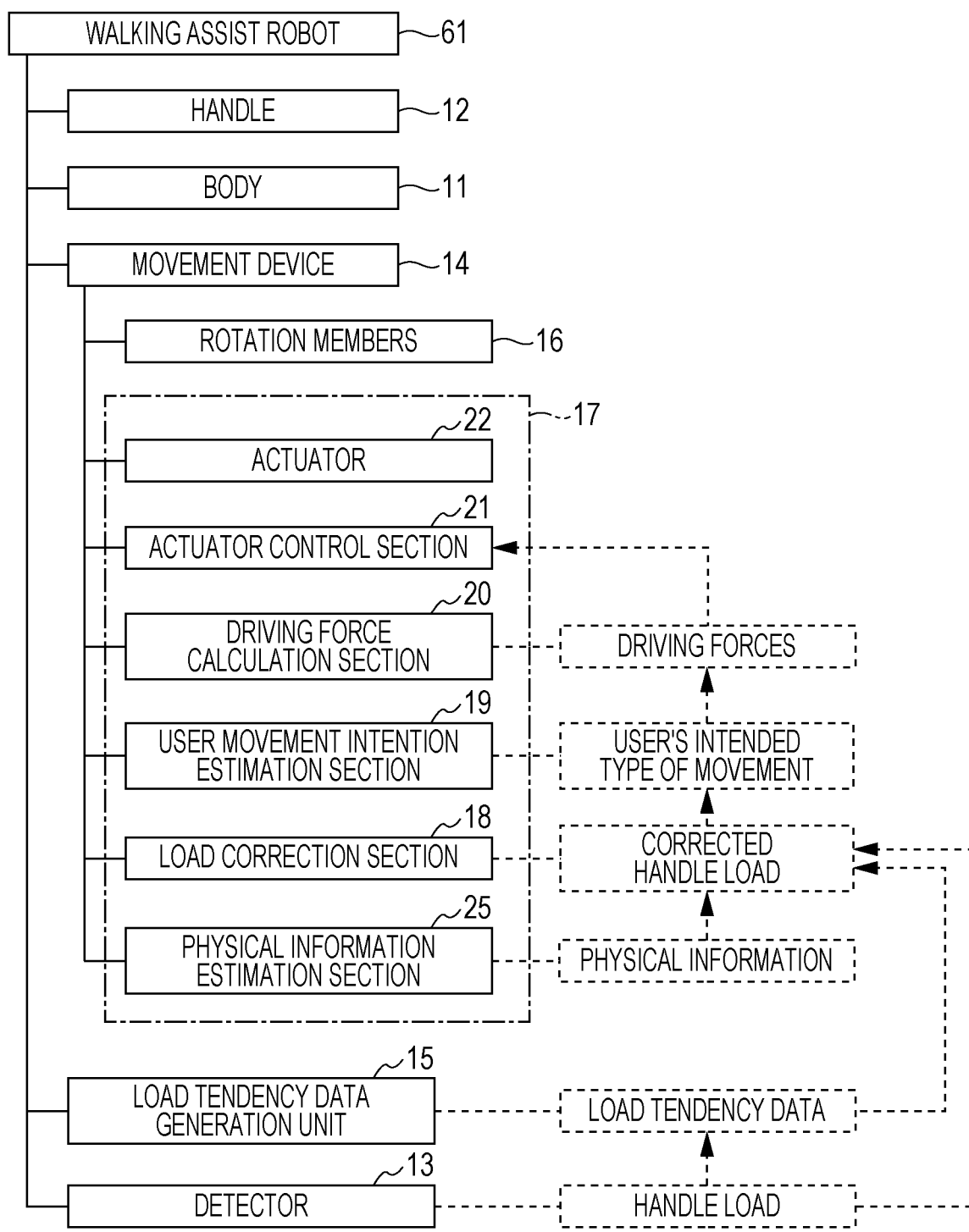
FIG. 23 is a control block diagram illustrating main control components of a walking assist robot according to a third embodiment of the present disclosure.
Figure 24:
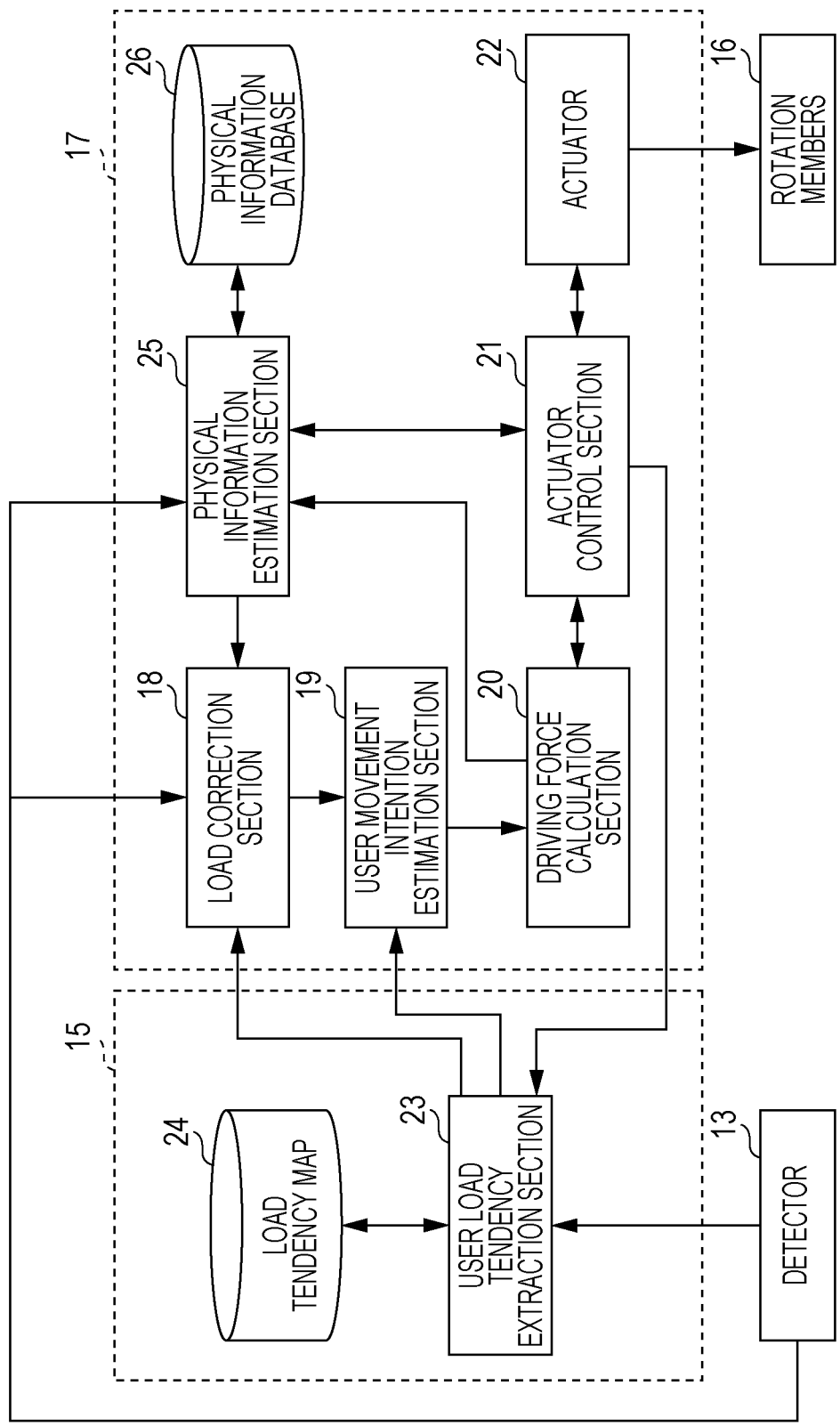
FIG. 24 is a control block diagram illustrating control components of the walking assist robot for assisting the user in walking according to the third embodiment of the present disclosure.

FIG. 23 is a control block diagram illustrating main control components of a walking assist robot 61 (hereinafter referred to as a "robot 61") according to the third embodiment. The control block diagram of FIG. 23 also illustrates a relationship between the control components and information handled by the control components. FIG. 24 is a control block diagram illustrating detailed control components of the robot 61 for assisting the user in walking.

As illustrated in FIGS. 23 and 24, the robot 61 according to the third embodiment is different from the robots 1 and 51 according to the first and second embodiments in that the robot 61 includes a physical information estimation section 25 and a physical information database 26. In the third embodiment, the physical information database 26 is not a mandatory component.

The physical information estimation section 25 estimates the user's physical information. Physical information herein refers to physical information with respect to walking and includes, for example, walking speed, pace, body inclination, a stagger, stride, and muscular strength. The physical information is not limited to these pieces of information. For example, the physical information may include an average load in the movement direction, an average load in the center of gravity offset direction, a fluctuation frequency in the movement direction, and a fluctuation frequency in the lateral direction.

The physical information estimation section 25 estimates the physical information on the basis of, for example, information regarding the handle load detected by the detector 13, information regarding the rotation speeds of the wheels 16 obtained by the actuator control section 21, and information regarding the driving forces calculated by the driving force calculation section 20.

The physical information database 26 stores physical information for each user. The physical information database 26 stores the physical information estimated by the physical information estimation section 25 for each user and updates the physical information.

Estimation of Physical Information

Figure 25:
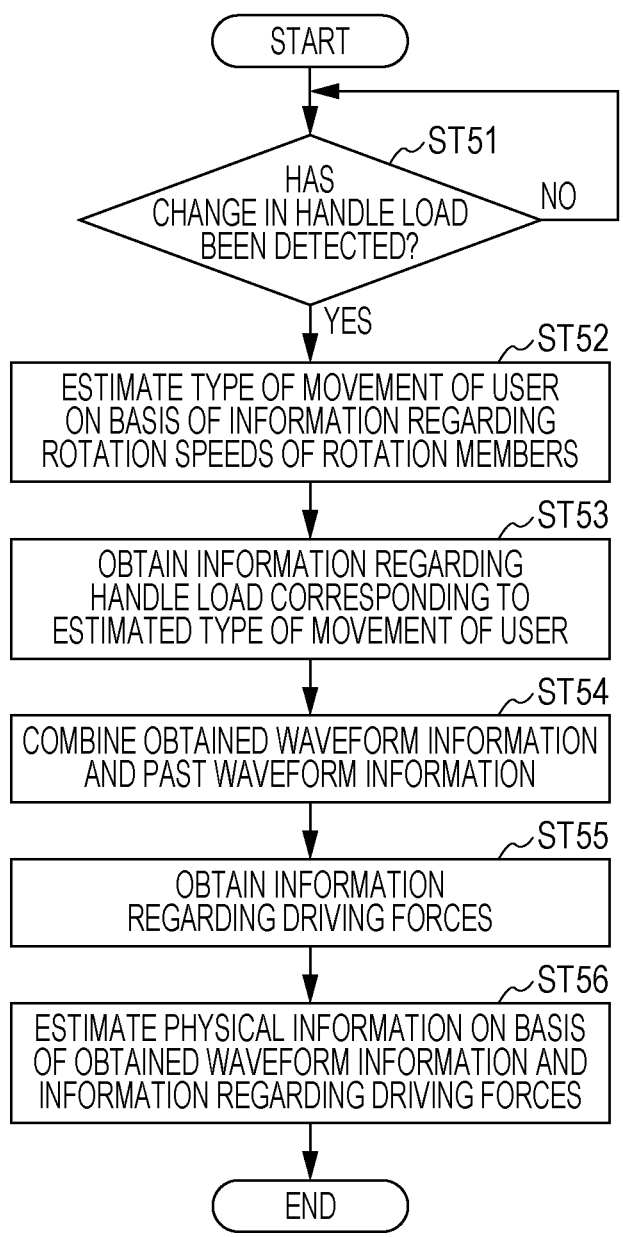
FIG. 25 is an exemplary flowchart illustrating a process for estimating physical information performed by the walking assist robot according to the third embodiment of the present disclosure.

The estimation of the physical information will be described with reference to FIG. 25. FIG. 25 is an exemplary flowchart illustrating a process for estimating the physical information performed by the walking assist robot 61 according to the third embodiment.

As illustrated in FIG. 25, in step ST51, the detector 13 detects a change in the handle load. If the detector 13 detects a change in the handle load, the process proceeds to step ST52. If the detector 13 does not detect a change in the handle load, step ST51 is repeated.

In step ST52, the physical information estimation section 25 estimates the type of movement of the user on the basis of information regarding the rotation speeds of the wheels 16. More specifically, after the change in the handle load is detected in step ST51, the actuator control section 21 obtains the information regarding the rotation speeds of the wheels 16. The information regarding the rotation speeds obtained by the actuator control section 21 is transmitted to the physical information estimation section 25. The physical information estimation section 25 estimates the type of movement of the user on the basis of the information regarding the rotation speeds of the wheels 16, that is, the rotation direction and the number of rotations of the wheels 16. In the third embodiment, the physical information estimation section 25 estimates the type of movement of the user on the basis of the rotation speeds of the left and right wheels 16. If the rotation speed of the right wheel 16 is higher than the rotation speed of the left wheel 16, for example, the physical information estimation section 25 may estimate that the user is turning left. If the number of rotations of the left and right wheels 16 is the same and the wheels 16 are rotating forward, on the other hand, the physical information estimation section 25 may estimate that the robot 61 is moving forward.

In step ST53, the physical information estimation section 25 obtains waveform information regarding the handle load corresponding to the estimated type of movement of the user. The waveform information regarding the handle load corresponding to the type of movement of the user is not particularly limited, but, if the user applies the force Fy+, for example, the waveform information may be waveform information regarding the force Fz or the moment My included in the handle load or the like.

In step ST54, the physical information estimation section 25 combines the obtained waveform information regarding the handle load and waveform information regarding past handle loads. The past waveform information is stored, for example, in the physical information database 26. The physical information estimation section 25 reads the past waveform information from the physical information database 26 and adds the obtained current waveform information to the past waveform information. Input waveform information regarding the handle load is, for example, the waveform information regarding the handle loads illustrated in FIG. 8.

In step ST55, the physical information estimation section 25 obtains information regarding the driving forces. More specifically, the physical information estimation section 25 obtains the information regarding the driving forces from the driving force calculation section 20.

In step ST56, the physical information estimation section 25 estimates the physical information on the basis of the waveform information obtained in step ST54 and the information regarding the driving forces obtained in step ST55.

In the third embodiment, the physical information estimation section 25 estimates walking speed, pace, body inclination, a stagger, stride, and muscular strength as the physical information.

The walking speed is calculated, for example, by calculating a movement distance on the basis of the information regarding the driving forces and dividing the movement distance by a movement time.

The pace refers to the number of steps in unit time. The pace is calculated by dividing the number of steps by a movement time. It is to be noted that the pace is calculated on the basis of information regarding a change in the handle load. If the user is walking forward, for example, the user is alternately moving his/her left and right feet forward. Waveform information regarding the handle load of the user who is moving forward changes in accordance with a cycle of walking. In the waveform information regarding the handle load, therefore, the force Fz+ exhibits a positive peak when the toe of the user's left or right foot leaves the ground, that is, at a time of toe-off. The pace, therefore, can be calculated by counting a period from a peak to a next peak as a step. A positive peak may be identified, for example, on the basis of a point at which the handle load that has been increasing begins to decrease, or on the basis of a maximum value of a quadratic curve estimated using a method of least squares.

The body inclination is calculated on the basis of the information regarding the handle load. The body inclination is calculated on the basis of an offset of the load caused by an offset of the center of gravity of the user. In the case of a user who walks with the center of gravity offset to the right, for example, the force Fx+ is calculated as the body inclination.

The stagger is calculated by calculating a fluctuation frequency on the basis of the obtained waveform information. More specifically, the physical information estimation section 25 calculates the fluctuation frequency by conducting a frequency analysis on the handle load corresponding to the estimated type of movement of the user.

The stride is calculated on the basis of a movement distance between toe-off points. The movement distance between toe-off points is calculated, for example, on the basis of the waveform information regarding the handle load and the information regarding the driving forces. As described above, the waveform information regarding the handle load and the cycle of walking change in accordance with each other. For example, the physical information estimation section 25 counts a period from a positive peak to a next positive peak of the force Fz+ as a step in the waveform information regarding the handle load and determines whether the step corresponds to the left foot or the right root on the basis of the force Fx and/or the moment Mz. Next, the physical information estimation section 25 calculates a movement distance for each step on the basis of the information regarding the driving forces.

The muscular strength is calculated from an offset of the load at each foot position, a difference between strides of the left and right feet, a difference between movement distances of the left and right feet, and the like. The muscular strength is represented, for example, by six levels (levels 0 to 5) for each of the user's leg muscles used for walking (e.g., a tibialis anterior, a peroneus, and the like). The higher the level, the higher the muscular strength.

In the third embodiment, data on the physical information is calculated on the basis of information regarding 10 steps. More specifically, an average of data regarding 10 steps is calculated as the physical information. The physical information is not limited to an average of data regarding 10 steps. For example, the physical information may be data regarding one to nine steps, data regarding 11 or more steps, or data regarding 10 steps multiplied by data regarding a plurality of results. Alternatively, the physical information may be a median, not an average, of data regarding 10 steps.

The data on the physical information obtained in this manner is stored in the physical information database 26. The physical information stored in the physical information database 26 is updated after the estimation of the physical information is performed.

FIG. 26A illustrates an example of the physical information stored in the physical information database 26 of the robot 61. As illustrated in FIG. 26A, as physical information regarding a user A, walking speed, pace, body inclination, a stagger, stride, and the muscular strength of the legs are used.

FIG. 26B illustrates another example of the physical information stored in the physical information database 26 of the robot 61. As illustrated in FIG. 26B, as physical information regarding the user A during forward movement, walking speed, pace, an average load in the movement direction, an average load in the center of gravity offset direction, a fluctuation frequency in the movement direction, a fluctuation frequency in the lateral direction, stride, and the muscular strength of the legs are used. The physical information illustrated in FIG. 26B indicates that two input waveforms "No. 1" and "No. 3" of the handle load have been combined.

Estimation of User's Intended Type of Movement

Figure 27:
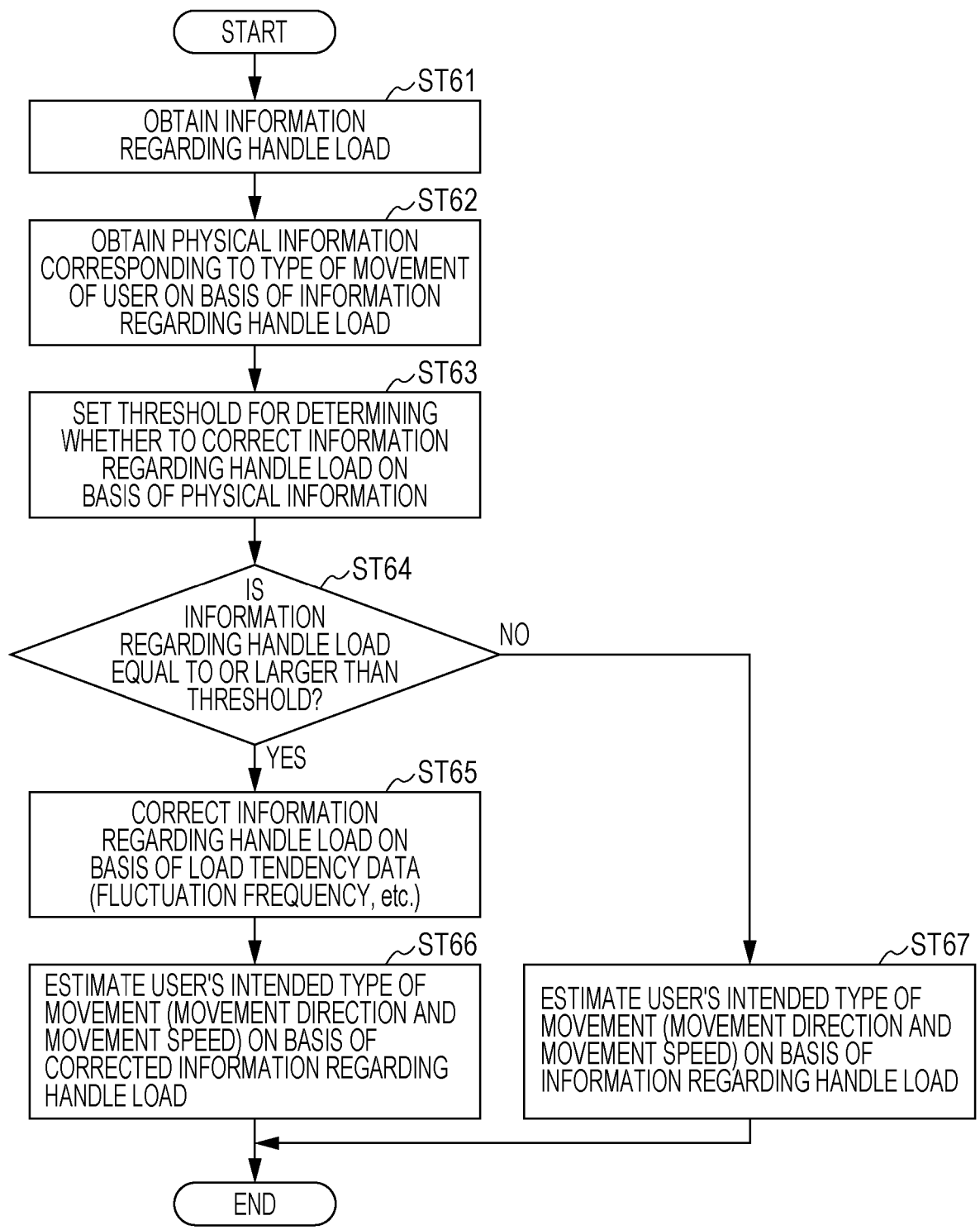
FIG. 27 is an exemplary flowchart illustrating a process for estimating the user's intended type of movement performed by the walking assist robot according to the third embodiment of the present disclosure.

In the third embodiment, the handle load is corrected on the basis of the physical information, and the user's intended type of movement is estimated on the basis of information regarding the corrected handle load. FIG. 27 is an exemplary flowchart illustrating a process for estimating the user's intended type of movement performed by the robot 61.

As illustrated in FIG. 27, in step ST61, the detector 13 obtains information regarding a handle load.

In step ST62, the physical information estimation section 25 obtains physical information corresponding to the type of movement of the user on the basis of the information regarding the handle load. More specifically, the physical information database 26 estimates the type of movement of the user on the basis of the information regarding the handle load. Next, the physical information estimation section 25 obtains the physical information corresponding to the estimated type of movement of the user from the physical information database 26. The physical information estimation section 25 transmits the obtained physical information to the load correction section 18.

In step ST63, the load correction section 18 sets, on the basis of the physical information, a threshold for determining whether to correct the information regarding the handle load. In step ST63, the load correction section 18 adjusts a degree of correction by setting the threshold for the correction of the information regarding the handle load in accordance with the user's level of physical ability.

In the third embodiment, the threshold for determining whether to correct the information regarding the handle load refers to a threshold for determining whether to correct the information regarding the handle load in terms of the body inclination (a load in an inclination direction), the stagger (fluctuation frequency), or the like.

The degree of correction herein refers to how easily the correction is performed. A high degree of correction means that the correction is easily performed, and a low degree of correction means that the correction is not easily performed.

A user whose level of physical ability is high, for example, can walk as intended without the correction of the handle load. In this case, even if the user applies a large load in a forward direction to move fast, the handle load might be corrected to a smaller value. In order to avoid this, the load correction section 18 increases the threshold to decrease the degree of correction. On the other hand, a user whose level of physical ability is low tends to incline or stagger, and it is difficult for the user to walk as intended without the correction of the handle load. In this case, the load correction section 18 decreases the threshold to increase the degree of correction.

A user whose level of physical ability is high herein refers to, for example, a user having a higher level of physical ability than an average level of physical ability of his/her age. A user whose level of physical ability is low herein refers to, for example, a user having a lower level of physical ability than the average level of physical ability of his/her age.

In the third embodiment, the load correction section 18 determines the user's level of physical ability on the basis of physical information regarding the average level of physical ability of his/her age. More specifically, the load correction section 18 determines the user's level of physical ability using an average walking speed of people of his/her age (hereinafter referred to as an "average walking speed of his/her age") as reference physical information. If the user's walking speed is equal to or higher than the average walking speed of his/her age, for example, the load correction section 18 determines that the user's level of physical ability is high, and if the user's walking speed is lower than the average waking speed of his/her age, the load correction section 18 determines that the user's level of physical ability is low.

Average physical information of the user's age is stored, for example, in the physical information database 26. The average physical information of the user's age refers to, for example, average physical information of an age of 63 if the user is 63 years old. In the third embodiment, the physical information estimation section 25 may transmit the average physical information of the user's age to the load correction section 18 along with the physical information regarding the user.

If determining that the user's level of physical ability is high, that is, if determining that the user's walking speed is equal to or higher than the average walking speed of his/her age, the load correction section 18 increases the threshold for determining whether to correct the information regarding the handle load. In determining that the user's level of physical ability is low, that is, if determining that the user's walking speed is lower than the average walking speed of his/her age, on the other hand, the load correction section 18 decreases the threshold for determining whether to correct the information regarding the handle load. In the third embodiment, the walking speed is thus used as a reference for determining the threshold for determining whether to correct the information regarding the handle load.

As an example, a case in which the load correction section 18 has determined that the user's walking speed is equal to or higher than the average walking speed of his/her age will be described. In this example, if an average load of the user's age in the forward direction is 20 N, the load correction section 18 sets a threshold for correcting the body inclination to 20 N. If an average frequency of a stagger of the user's age in the forward direction is 1.0 Hz, the load correction section 18 sets a threshold for correcting the stagger to 1.0 Hz. The threshold is thus increased for a user whose level of physical ability is high so that the correction is not easily performed.

A case in which the load correction section 18 has determined that the user's walking speed is lower than the average walking speed of his/her age will be described. In this example, if the user's level of physical ability is low, the correction according to the load tendency may always be performed. Alternatively, a smaller threshold than for a user whose level of physical ability is high may be set in order to easily perform the correction on the user whose level of physical ability is low.

In step ST64, the load correction section 18 determines whether the information regarding the handle load is equal to or larger than the threshold set in step ST63. If the information regarding the handle load is equal to or larger than the threshold, the process proceeds to step ST65 in order to correct the information regarding the handle load. If the information regarding the handle load is smaller than the threshold, the process proceeds to step ST67.

As an example, when it has been determined that the user's walking speed is equal to or higher than the average walking speed of his/her age, the load correction section 18 causes the process to proceed to step ST65 if a load of 20 N or more is applied in the forward direction or if the frequency in the forward direction becomes 1.0 Hz or more. On the other hand, if a load of less than 20 N is applied in the forward direction and the frequency in the forward direction is lower than 1.0 Hz, the load correction section 18 causes the process to proceed to step ST67.

When it has been determined that the user's walking speed is lower than the average walking speed of his/her age, the load correction section 18 causes the process to proceed to step ST65 if the frequency of a stagger in the forward direction becomes 0 Hz or more. In the third embodiment, the threshold for correcting a stagger in the forward direction is set to 0 Hz, and the correction is essentially performed if any handle load is applied.

In step ST65, the load correction section 18 corrects the information regarding the handle load on the basis of the load tendency data (fluctuation frequency or the like). Step ST65 is the same as the corresponding processing in the process for correcting the handle load according to the first or second embodiment, and description thereof is omitted.

In step ST66, the user movement intention estimation section 19 estimates the user's intended type of movement (the movement direction and the movement speed) on the basis of the information regarding the corrected handle load. Step ST66 is the same as the corresponding processing in the process for correcting the load according to the first or second embodiment, and description thereof is omitted.

In step ST67, the load correction section 18 estimates the user's intended type of movement without correcting the information regarding the handle load. Step ST67 is the same as the corresponding processing in the process for correcting the load according to the first or second embodiment, and description thereof is omitted.

As described above, the robot 61 assists the user in walking in accordance with the user's level of physical ability by setting, on the basis of the physical information, the threshold for determining whether to correct information regarding the handle load.

Advantageous Effects

With the walking assist robot 61 according to the third embodiment, the following advantageous effects are produced.

With the walking assist robot 61 according to the third embodiment, the threshold for determining whether to correct the handle load is set on the basis of the physical information. With this configuration, the degree of correction can be adjusted, and it becomes possible to assist the user in walking in accordance with the user's level of physical ability.

A user whose level of physical ability is high, for example, can walk as intended without the correction of the handle load. In this case, the robot 61 can suppress excessive correction of the handle load by increasing the threshold for determining whether to correct information regarding the handle load. For example, an unintended type of control, such as suppression of speed through the correction at a time when the user applies a large handle load to move forward fast, can be suppressed.

In addition, a user whose level of physical ability is low might apply an unintended load onto the handle 12. In this case, the robot 61 makes it easier to correct the handle load by decreasing the threshold for determining whether to correct information regarding the handle load. As a result, even the user whose level of physical ability is low can walk as intended.

Although walking speed is used as a reference for determining the threshold for determining whether to correct information regarding the handle load in the third embodiment, the reference used is not limited this. The reference for determining the threshold may be, for example, any piece of physical information such as walking speed, pace, stride, muscular strength, an offset of the load, a fluctuation in the load, or any combination of these parameters. When these parameters are used as references for determining the threshold, the degree of correction can be set more finely.

Alternatively, the reference for determining the threshold may be an average or a median of the physical information (walking speed, pace, or the like) regarding people of the user's age or the like.

Although the threshold for correcting the stagger in the forward direction is set to 0 Hz if the user's level of physical ability is low, that is, if the user's walking speed is lower than the average walking speed of his/her age, in the third embodiment, the type of control performed is not limited to this. If the user's level of physical ability is low, the threshold for correcting the stagger in the forward direction may be set to a different value, namely 0.5 Hz, for example, or the threshold for correcting the body inclination in the forward direction may be set to 10 N, instead.

Although the average load of body inclination of the user's age, namely 20 N, and the average frequency of the stagger of the user's age, namely 1.0 Hz, are set as thresholds if the user's level of physical ability is high, that is, if the user's walking speed is equal to or higher than the average walking speed of his/her age, in the third embodiment, the type of control performed is not limited to this. If the user's level of physical ability is high, for example, the threshold may be set to a different value, or the correction function may be disabled, instead.

Although the load correction section 18 sets the threshold according to the user's level of physical ability by determining the user's level of physical ability on the basis of the physical information of his/her age in the third embodiment, the type of control performed is not limited to this.

As an example, a case in which the load correction section 18 sets the threshold in accordance with a level of physical ability of a corresponding age group will be described. In this example, a threshold is provided for each age group. For example, for age groups of 50 to 59 years old, 60 to 69 years old, and 70 to 79 years old, thresholds of 15 N, 10 N, and 5 N may be set for the load in the forward direction, and thresholds of 1.0 Hz, 1.2 Hz, and 1.4 Hz may be set for the fluctuation in the forward direction, respectively.

In this example, the load correction section 18 may determine, on the basis of the user's physical information, which age group the user's level of physical ability falls into, and set the threshold according to the age group. If the load correction section 18 determines, on the basis of the user's physical information (walking speed, pace, or the like), that the user's level of physical ability corresponds to the level of physical ability of the age group of 60 to 69 years old, for example, the load correction section 18 may set the threshold for the load in the forward direction to 10 N and the threshold for the fluctuation in the forward direction to 1.2 Hz.

Although the threshold is set in accordance with the user's level of physical ability in the third embodiment, the type of control performed is not limited to this. If it is determined that the level of physical ability is low, for example, the threshold provided in accordance with the level of physical ability of each age group may be set as described above. If it is determined that the user's level of physical ability is low, for example, the threshold may be changed stepwise in accordance with the level of physical ability of each age group.

Although the physical information estimation section 25 estimates the physical information on the basis of the waveform information obtained in step ST54 and the information regarding the driving forces obtained in step ST55 in the third embodiment, the type of control performed is not limited to this. For example, the physical information estimation section 25 may estimate the physical information on the basis of the waveform information obtained in step ST54 and the rotation speeds of the wheels 16 measured by the actuator control section 21, instead.

User Notification Unit

Figure 28:
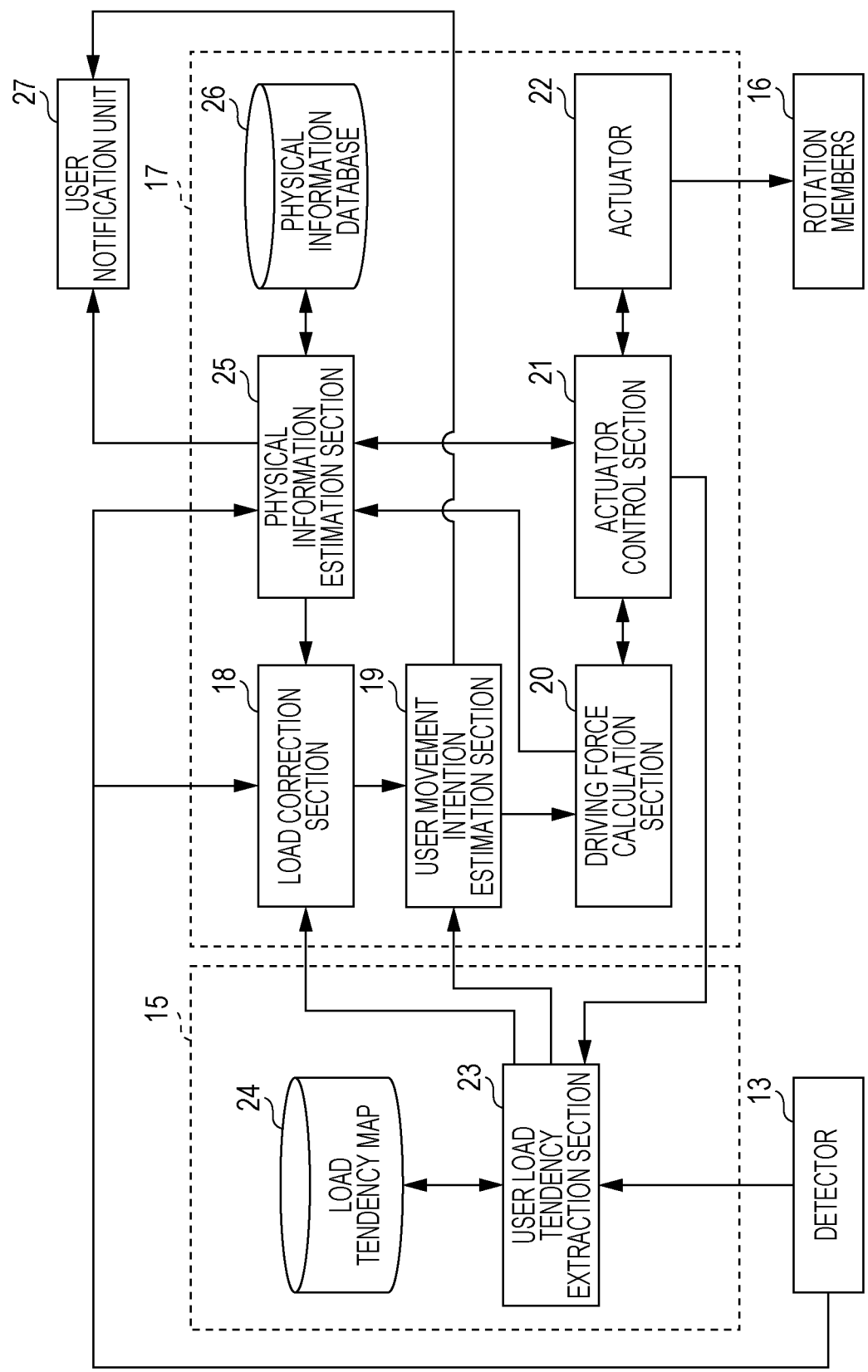
FIG. 28 is another control block diagram illustrating control components of the walking assist robot for assisting the user in walking according to the third embodiment of the present disclosure.

FIG. 28 is another control block diagram illustrating control components of the robot 61 for assisting the user in walking. As illustrated in FIG. 28, the robot 61 may include a user notification unit 27.

The user notification unit 27 notifies the user of at least either the physical information or the user's intended type of movement. More specifically, the user notification unit 27 obtains the estimated physical information from the physical information estimation section 25. The user notification unit 27 also obtains the information regarding the user's intended type of movement from the user movement intention estimation section 19.

The user notification unit 27 includes, for example, a light-emitting diode (LED), a display, a speaker, or the like. The user notification unit 27 may include any combination of an LED, a display, and a speaker, instead.

A case in which the user notification unit 27 includes an LED will be described. After the physical information is obtained, for example, the user notification unit 27 may correct the load on the basis of the physical information, and after the user's intended type of movement is estimated, the user notification unit 27 may turn on the LED. Information to be presented may be indicated by different patterns of flashing of the LED.

A case in which the user notification unit 27 includes a display will be described. After the physical information is obtained, the user notification unit 27 may display a message such as "Your walking speed is XX km/h", "Your pace is YY steps/min", or "Your right leg muscle is weak" on the display. In addition, after the handle load is corrected on the basis of the physical information and the user's intended type of movement is estimated, the user notification unit 27 may display a message such as "Assisting you", "Changing control for you", "Applying brakes", "Suppressing stagger", or "Stabilizing". The messages to be displayed are not limited to these.

A case in which the user notification unit 27 includes a speaker will be described. After the physical information is obtained, the user notification unit 27 may output a message such as "Your walking speed is XX km/h", "Your pace is YY steps/min", or "Your right leg muscle is weak" through the speaker. In addition, after the handle load is corrected on the basis of the physical information and the user's intended type of movement is estimated, the user notification unit 27 may output a message such as "Assisting you", "Changing control for you", "Applying brakes", "Suppressing stagger", or "Stabilizing" through the speaker. The messages to be output through the speaker are not limited to these.

As a result, since the user notification unit 27 is included, the user can visually and/or aurally obtain the physical information and information regarding the robot 61 assisting the user in walking.

Because of the user notification unit 27, the user can understand his/her daily physical information. As a result, the user is motivated to maintain or improve his/her level of physical ability and becomes alert during walking.

In addition, because of the user notification unit 27, the user can understand a control state of the robot 61. As a result, the user can adapt to a change in the operation, such as a stronger braking operation.

Although the present disclosure has been described in some detail on the basis of the embodiments, details of the components described in the embodiments may vary. In addition, a combination of elements and the order of elements may be changed in each embodiment without deviating from the scope and spirit of the present disclosure.

The correction of the handle load based on the load tendency data described in the first to third embodiments is an example, and is not particularly limited. Various known correction methods may be used for the correction of the handle load based on the load tendency data. For example, a method for smoothing a fluctuation in the center of gravity offset direction by a movement average in accordance with a degree of fluctuation, a method for removing a fluctuation by performing smoothing using a median filter, or a method for removing or reducing particular frequencies by conducting a frequency analysis may be used.

The present disclosure can be used for a walking assist robot and a method for assisting walking that assist a user in walking more comfortably.

What is claimed is:

1. A robot, comprising:
 a body;
 a handle provided on the body and holdable by a user;
 a sensor that detects a load applied to the handle;
 a movement device that includes a rotation member and moves the robot by controlling rotation of the rotation member in accordance with the detected load; and
 a processor that generates tendency data, which indicates tendency of the load applied to the handle, based on past load data regarding the handle obtained while the robot is moving,
 wherein the movement device includes an actuator that controls a rotation speed of the rotation member based on the detected load and the generated tendency data, and
 wherein the movement device corrects the load applied to the handle based on the tendency data, and wherein the actuator controls the rotation speed of the rotation member based on the corrected load.

2. The robot according to claim 1,
 wherein the movement device corrects the detected load based on the tendency data, and wherein the actuator controls the rotation speed of the rotation member based on the corrected load.

3. The robot according to claim 2, wherein the processor generates the tendency data for each type of movement of the robot, and wherein the movement device corrects the load based on the tendency data corresponding to a movement operation of the robot at a time when the load is detected.

4. The robot according to claim 3, wherein, when the tendency data corresponding to the movement operation of the robot becomes equal to or higher than a certain threshold, the movement device corrects the load based on the tendency data.

5. The robot according to claim 2, wherein the tendency data is a fluctuation frequency calculated from the past load data, and wherein the movement device corrects the load by filtering a fluctuation frequency component of the detected load.

6. The robot according to claim 2, wherein the tendency data is an average load calculated from the past load data, and wherein the movement device corrects the load based on the average load.

7. The robot according to claim 6, wherein the movement device corrects the load by subtracting the average load from the detected load.

8. The robot according to claim 2, wherein the processor estimates physical information regarding the user, and wherein the movement device corrects the load based on the estimated physical information.

9. The robot according to claim 8, further comprising: at least one of a light, a display, or a speaker that notifies the user of the physical information.

10. The robot according to claim 9, wherein the processor estimates the an intended type of movement based on the corrected load, and wherein the at least one of the light, the display, or the speaker notifies the user of the intended type of movement.

11. The robot according to claim 1, further comprising: a storage that stores a control table indicating a correspondence between the load applied to the handle and the rotation speed of the rotation member, wherein the actuator drives the rotation member with the rotation speed, corresponding to the detected load, using the control table, and wherein the control table is updated by correcting the load based on the tendency data.

12. The robot according to claim 1, wherein the sensor detects loads applied to the handle along a plurality of axes, and wherein the movement device switches a movement operation of the robot by controlling the rotation of the rotation member in accordance with the loads applied along the plurality of axes.

13. The robot according to claim 12, wherein movement operations include forward movement, rearward movement, and turn movement of the robot.

14. The robot according to claim 13, wherein the actuator changes a turning radius of the turn movement based on the tendency data.

15. A method used in a robot, the method comprising:
detecting a load applied to a handle of the robot using a sensor;
generating tendency data, which indicates tendency of the load applied to the handle, based on past load data regarding the handle obtained while the robot is moving; and
controlling a rotation speed of a rotation member included in a movement device of the robot based on the detected load and the generated tendency data,
wherein the movement device corrects the load applied to the handle based on the tendency data, and wherein the actuator controls the rotation speed of the rotation member based on the corrected load.

16. The method according to claim 15, further comprising:
correcting the detected load based on the tendency data, wherein the controlling controls the rotation speed of the rotation member based on the corrected load.

17. The method according to claim 16, further comprising:
estimating physical information regarding a user, wherein the correcting corrects the load based on the physical information.

18. The method according to claim 17, further comprising:
notifying the user of the physical information.

19. The method according to claim 18, further comprising:
estimating an intended type of movement based on the corrected load,
wherein the notifying notifies the user of the intended type of movement.

* * * * *